US007031984B2

(12) United States Patent
Kawamura et al.

(10) Patent No.: US 7,031,984 B2
(45) Date of Patent: *Apr. 18, 2006

(54) DISASTER RECOVERY PROCESSING METHOD AND APPARATUS AND STORAGE UNIT FOR THE SAME

(75) Inventors: Nobuo Kawamura, Atsugi (JP); Masaru Kitsuregawa, Tokyo (JP); Kazuo Masai, Kamakura (JP)

(73) Assignee: Hitachi, Ltd., Tokyo (JP)

( * ) Notice: Subject to any disclaimer, the term of this patent is extended or adjusted under 35 U.S.C. 154(b) by 352 days.

This patent is subject to a terminal disclaimer.

(21) Appl. No.: 10/628,467

(22) Filed: Jul. 29, 2003

(65) Prior Publication Data

US 2004/0139124 A1 Jul. 15, 2004

(30) Foreign Application Priority Data

Dec. 19, 2002 (JP) ............................. 2002-368688

(51) Int. Cl.
G06F 17/30 (2006.01)
(52) U.S. Cl. .................................. 707/104.1; 707/100
(58) Field of Classification Search .................... 707/3, 707/200, 201, 202, 203, 204, 205, 206, 100, 707/104.1
See application file for complete search history.

(56) References Cited

U.S. PATENT DOCUMENTS

| 4,751,702 | A | 6/1988 | Beier et al. ................... 714/13 |
| 4,821,172 | A | 4/1989 | Kaneko et al. ................. 710/5 |
| 5,280,611 | A * | 1/1994 | Mohan et al. .................. 707/8 |
| 5,640,561 | A | 6/1997 | Satoh et al. ................... 707/202 |
| 5,758,355 | A | 5/1998 | Buchanan .................... 707/201 |
| 6,173,292 | B1 | 1/2001 | Barber et al. ................ 707/200 |
| 6,226,651 | B1 | 5/2001 | Masuda et al. .............. 707/202 |
| 6,466,951 | B1 | 10/2002 | Birkler et al. ............... 707/201 |
| 6,502,205 | B1 | 12/2002 | Yanai et al. .................... 714/7 |
| 6,643,795 | B1 | 11/2003 | Sicola et al. ................... 714/6 |
| 6,732,124 | B1 | 5/2004 | Koseki et al. ............... 707/202 |
| 6,748,502 | B1 | 6/2004 | Watanabe et al. ........... 711/158 |
| 6,850,958 | B1 | 2/2005 | Wakabayashi .............. 707/204 |
| 2002/0095547 | A1 | 7/2002 | Watanabe et al. ........... 711/114 |
| 2002/0103815 | A1 | 8/2002 | Duvillier et al. ............ 707/203 |
| 2002/0107878 | A1 | 8/2002 | Tsuchida et al. ............ 707/204 |
| 2002/0133507 | A1 | 9/2002 | Holenstein et al. ......... 707/200 |

(Continued)

OTHER PUBLICATIONS

R. Ramakrishnan and J. Gehrke,Database Management Systems, 2nd Edition, Copyright 2000, pp. 1-26.*

(Continued)

Primary Examiner—Apu M. Mofiz
(74) Attorney, Agent, or Firm—Mattingly, Stanger, Malur & Brundidge, P.C.

(57) ABSTRACT

Judgement is made to determine whether or not an access request from a host computer is a write request and whether or not the contents of the write request are log information indicating contents of database processing executed in a buffer by the host computer. When the contents of the write request are the log information, position information indicated in the log information is converted into physical position information in a primary storage system using a conversion table indicating a correspondence between logical position information recognized by the host computer and physical position information in the primary storage system. According to the contents of the log information, data is updated in a database area of the primary storage system represented by the physical position information converted using the conversion table. The access request is sent to a secondary storage system.

17 Claims, 16 Drawing Sheets

U.S. PATENT DOCUMENTS

2003/0074600 A1  4/2003  Tamatsu ........................ 714/6
2004/0133591 A1  7/2004  Holenstein et al. ......... 707/102

OTHER PUBLICATIONS

Bhide et al., An Efficient Scheme for Providing High Availability, 1992 ACM, pp. 236-245.*

A. Bhide, "An Efficient Scheme for Providing High Availability", IBM TJ Watson Research Center, pp. 236-245, Jun. 1992.

J. Gray et al, Transaction Processing: Concepts and Techniques, Morgan Kaufmann Publishers, 1993, pp. 556-557 and pp. 604-609.

Rahm, Performance Evaluation of Extended Storage Architectures for Transaction Processing, University of Kaiserslautern, Germany.

Veritas Volume Replicator, Enterprise-Class Disaster Recovery for Mission Critical Environments, 1992.

R. VanNatta, "Crash Recovery" Database Management System, $2^{nd}$ Edition, pp. 1-26.

* cited by examiner

FIG. 2

DB-DISK BLOCK CONVERSION TABLE — 28

| DATABASE AREA ID | FILE ID | BLOCK LENGTH | LONGICAL VOLUME ID | STORAGE SYSTEM NUMBER | LOGICAL UNIT NUMBER (LUN) | LOGICAL BLOCK ADDRESS (LBA) |
|---|---|---|---|---|---|---|
|  |  |  |  |  |  |  |
|  |  |  |  |  |  |  |
|  |  |  |  |  |  |  |
|  |  |  |  |  |  |  |

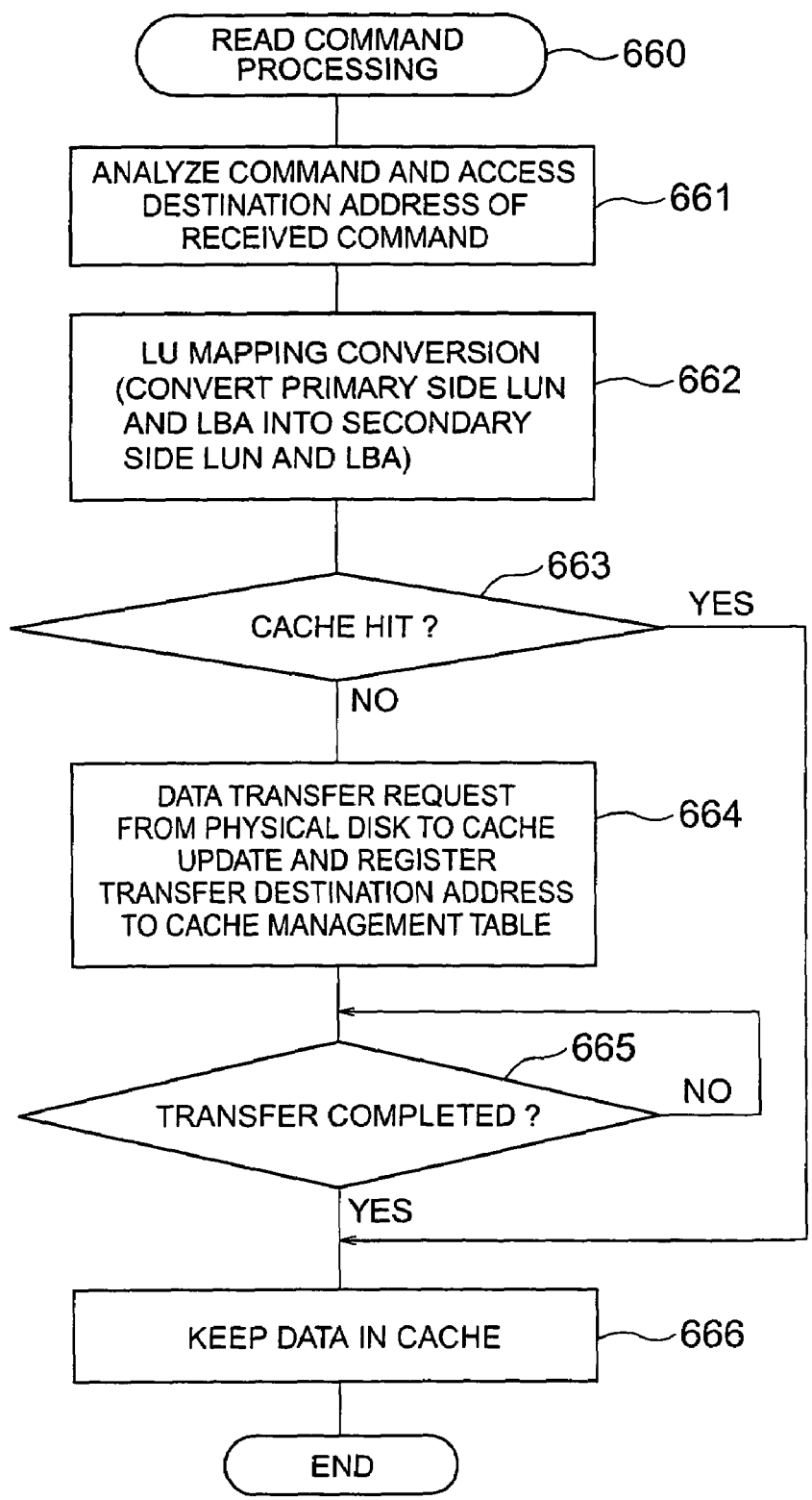

DISASTER RECOVERY PROCESSING METHOD AND APPARATUS AND STORAGE UNIT FOR THE SAME

CROSS-REFERENCE TO RELATED APPLICATION

This invention relates to patent application Ser. No. 10/628,516, filed Jul. 29, 2003, entitled DISASTER RECOVERY PROCESSING METHOD AND APPARATUS AND STORAGE UNIT FOR THE SAME by M. KITSUREGAWA et al. on claiming foreign priority under 35 U.S.C. Section 119 of Japanese Patent Application No. 2002-368676.

BACKGROUND OF THE INVENTION

The present invention relates to a disaster recovery system in which at occurrence of a failure in a primary database processing system, the system continues execution of the data processing by replacing the failed database processing system with a secondary database processing system, and in particular, to a technology effectively applicable to a disaster recovery system in which using log information indicating contents of database processing executed on a database buffer of a primary host computer, a database is updated in a magnetic disk device of a secondary storage system.

In a database management system of related art, database blocks and log blocks are communicated between a host computer and a storage. That is, to increase input/output efficiency, the database management system sets a database buffer in a main memory of the host computer such that the system possibly reduces input/output operations of the storage by caching a database block inputted from a storage onto the buffer. It is assumed that the storage unit is a storage such as a magnetic disk device having a lower speed and larger capacity when compared with the main memory.

Jim Gray and Andreas Reuter, "Transaction Processing: Concepts and Techniques", Morgan Kaufman Publishers, 1993, pp. 556–557 and pp. 604–609 discloses such a database management system. Data update processing is executed on a database block beforehand inputted to a database, update log information of the data update processing is written as a log item in a buffer dedicated to log information, and then the log item is forcibly outputted to a storage at completion of a transaction to thereby guarantee consistency. In the operation, to force to write the database block in the storage, it is required to strictly use so-called WAL (Write Ahead Log) in which the updated history log or modified log for the pertinent block is outputted to the storage in advance.

To cope with a failure, namely, to periodically guarantee consistency of the database, the database management system acquires a checkpoint during its operation. The checkpoint is a checkpoint guaranteeing consistency of the database and becomes a start point to execute restart processing at system failure. Typically, the checkpoint is usually acquired when the number of log blocks outputted during the operation reaches a predetermined number. In checkpoint processing, the system executes processing in which all database blocks updated in database buffers at the pertinent point of time are written in the storage.

There exists a so-called disaster recovery in which a replica is placed in a plurality of geographically dispersed sites. In the recovery, a replica of data of a site is placed in other sites geographically separated from each other such that at occurrence of failure in the site due to, for example, a disaster, one of the other sites recovers a job thus failed.

As described in U.S. Pat. No. 5,640,561, several methods of possessing such a replica have been used in database management systems. Basically, a request is sent to a primary system, namely, a primary system for clients; the primary system creates a log record, and the log record is used as backup. That is, the log record is sent from the primary system to a secondary system such that a host computer of the secondary system executes modify processing according to the log record to modify a state of the secondary system, the modify processing being the same as that of the primary system. The system produces a replica by sending the log record created by the primary system to the secondary system.

A technique of a storage system has been developed in which data on a magnetic disk of the storage system is written in a duplicate manner on a magnetic disk under another storage controller. Data is kept on a plurality of disks in a duplicate manner. Therefore, when a storage controller or a magnetic disk of a site fails, a job thus failed can be restored using a storage controller and a magnetic disk on which data was written in a duplicate manner.

SUMMARY OF THE INVENTION

In a method of writing a database block in a storage unit in the database management system of the related art, all database blocks modified in the database buffers as described above are written in the storage. However, since the database blocks thus modified also include records not modified, unnecessary input and output operations take place. This leads to a problem that a heavy load is imposed on the input and output processing between the host computer and the storage system.

In a system to implement the disaster recovery of the related art, the log record is sent from the primary system to the secondary system. This leads to a problem of a load on a network between the host computer of the primary system and that of the secondary system. Even in a state from which failures are absent, it is required that the host computer of the secondary system continuously operates to process log records such that the host computer of the secondary system executes processing which is the same as the modify processing executed by the host computer of the primary system.

In a storage system having the remote copy function of the related art, all of the data and log records constituting the database are copied. Therefore, records not updated are repeatedly copied and there arises a problem of a high input/output load between the storage systems.

It is therefore an object of the present invention to provide a technique to solve the problems in which when the contents of the database processing executed in a buffer of the host computer is reflected in the database area of the secondary storage system, the input/output processing load between the host computers and that between the storage systems can be reduced.

Another object of the present invention is to provide a technique in which when the contents of the database processing executed in a buffer of the host computer are forced in the database area of the secondary storage system using log information, the unnecessary input/output processing can be avoided.

Another object of the present invention is to provide a technique in which when the contents of the database processing executed in a buffer of the host computer are forced in the database area of the secondary storage system using log information, the processing to force the contents can be efficiently executed.

Another object of the present invention is to provide a technique capable of setting a warm cache state by loading a database block as an object of read operation in a cache of the secondary storage system.

According to the present invention, in a disaster recovery system in which the system continues database processing at occurrence of a failure in a primary database processing system by changing control from the primary database processing system to a secondary database processing system, a database area of a secondary storage system is modified according to the contents of log information sent from a host computer to a primary storage system.

In a disaster recovery system of the present invention, a host computer includes a database buffer to temporarily keep the contents of a database area of a storage system and a log buffer to temporarily keep the contents of modify processing for the database buffer. The contents of the database buffer are changed according to execution of database processing by the host computer. When it is required to force the contents of the change in the database area of the storage system, a primary host computer of a primary system sends to a primary storage system of the primary system an access request to write log information in the storage system, the log information indicating the contents of the modify processing executed in the database buffer.

The primary storage system receives the access request from the primary host computer and determines whether the received access request is a write request or a read request. If the received access request is a write request, the primary host computer makes a check to determine whether or not the contents of the write request are log information indicating the contents of database processing executed in the buffer of the primary host computer.

As a result of the determination, if the contents of the write request are the log information, the primary host computer refers to a first conversion table indicating a correspondence between logical position information recognized in the database processing of the primary host computer side and physical position information in the primary storage system. The primary host computer converts position information indicated in the log information into physical position information of the primary storage system and then modifies, according to the contents of the log information, data in the database area of the primary storage system indicated by the physical position information thus converted.

Next, the access request received from the primary host computer is transmitted to the secondary storage system of the secondary system.

The secondary storage system receives the access request and determines whether the received access request is a write request or a read request. If the received access request is a write request, the secondary storage system determines whether the contents of the write request are log information indicating the contents of database processing executed in the buffer of the primary host computer.

As a result of the determination, if the contents of the write request are the log information, the secondary storage system refers to a second conversion table indicating a correspondence between logical position information recognized in the database processing of the primary host computer side and physical position information in the secondary storage system. The secondary storage system converts position information indicated in the log information into physical position information in the secondary storage system and then updates, according to the contents of the log information, data in the database area of the secondary storage system indicated by the physical position information converted as above.

According to the present invention described above, when it is required to force the contents of the database buffer of the primary host computer in the database area of the secondary storage system, the primary host computer does not send all database blocks including at least one record for which update processing is executed to the secondary storage system, but sends the log information indicating the contents of the update processing for the database buffer to the secondary storage system. Therefore, the amount of data to be transmitted between the primary and secondary host computers and/or between the primary and secondary storage systems can be reduced.

According to the disaster recovery system of the present invention described above, the database area in the secondary storage system is updated according to the contents of the log information sent from the host computer to the primary storage system. Therefore, when the contents of the database processing executed on the buffer of the host computer are forced in the database area of the primary storage system, the input/output processing load can be reduced between the host computers and between the storage systems.

Other objects, features and advantages of the invention will become apparent from the following description of the embodiments of the invention taken in conjunction with the accompanying drawings.

BRIEF DESCRIPTION OF THE DRAWINGS

FIG. 2 is a diagram showing layout information of a database (DB)-disk block conversion table 28 in a first embodiment.

FIG. 16 is a flow chart showing a processing procedure of READ command processing in the secondary storage system 4 of the fourth embodiment.

DESCRIPTION OF THE EMBODIMENTS

First Embodiment

Next, description will be given of a first embodiment of a disaster recovery system in which a database in a magnetic disk device of a secondary storage system is updated using log information indicating the contents of database processing executed by a primary host computer.

Figure 1:
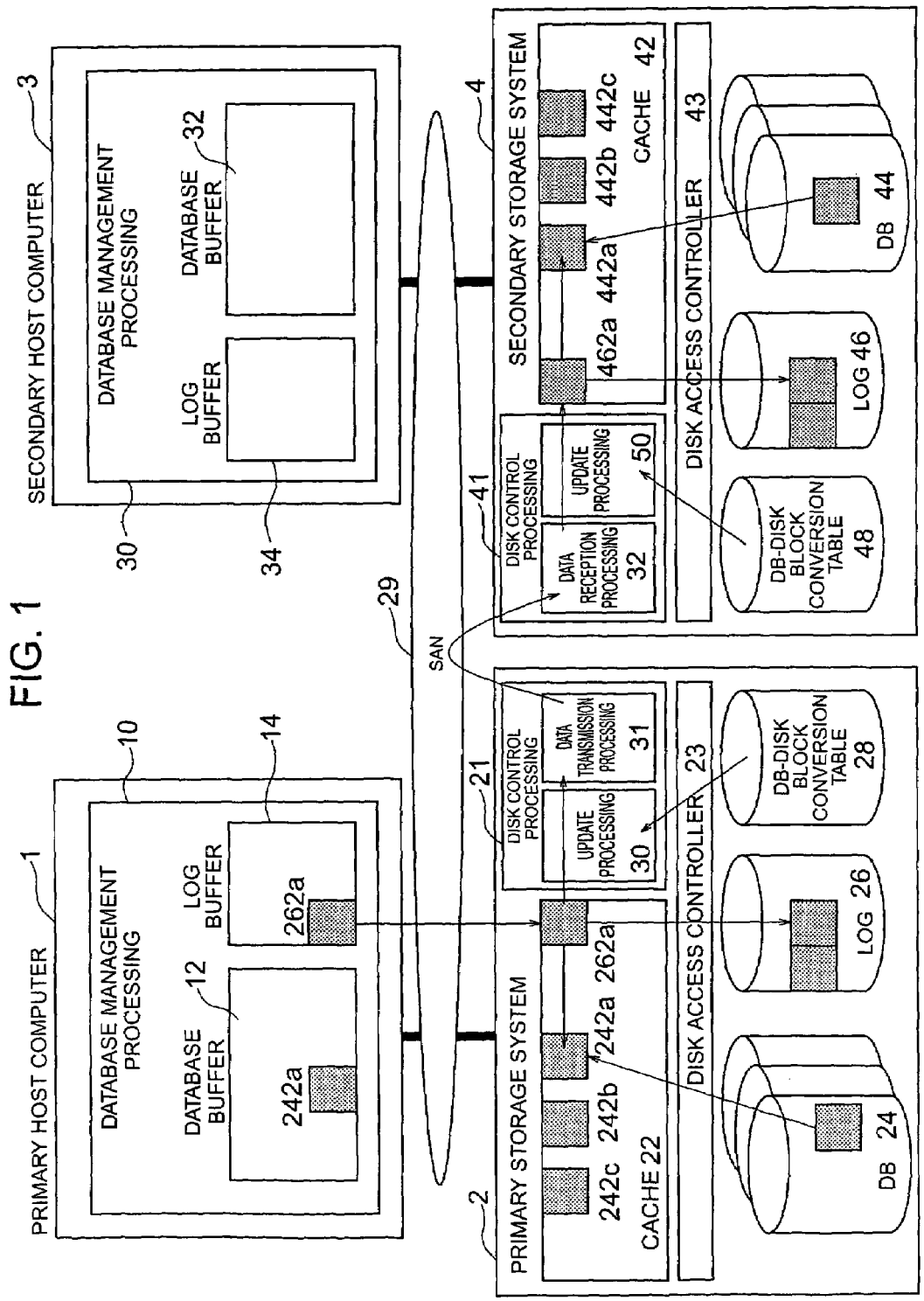
FIG. 1 is a diagram showing a system configuration of a first embodiment of a discovery system.

FIG. 1 shows a system configuration of the discovery system of the embodiment. As shown in FIG. 1, a primary host computer 1 of the embodiment includes a database management processing portion 10. The portion 10 is a processing portion in which when it is required to force the contents of a database (DB) buffer 12 of the primary host computer in a magnetic disk device of a storage system 2 as a primary storage system, a write request of a log block 262a which is log information indicating the contents of database processing executed for the database buffer 12 is sent from the primary host computer 1 to the primary storage system 2. If the database buffer 12 does not include data as an access object in the database processing, a read request of the data is sent from the primary host computer 1 to the primary storage system 2. The log information is also called "journal information". The log information stores at least write history log or write log of the database in the database processing. The unit called "host computer" in the example is not limited to a host computer but may be a computer, a data processor, or a server.

It is assumed that a program to operate the primary host computer 1 as a database management (processing) portion 10 is recorded on a recording medium such as a compact disc read-only memory (CD-ROM) and is then stored on a magnetic disk or the like. The program is thereafter loaded in a memory for execution thereof. The recording medium to record the program may be a recording medium other than the CD-ROM. The program may be installed for use from the recording medium in an information processor. Or, the system may access the recording medium via a network to use the program.

The primary storage system 2 includes a disk control processing portion 21, a disk access controller 23, an update processing portion 30, and a data transmission processing portion 31.

The disk control processing portion 21 is a control processing portion which controls processing to receive an access request sent from the primary host computer 1 to determine whether the access request is a write request or a read request and which controls the overall operation of the constituent components of the primary storage system. The storage system 2 may be a redundant arrays of independent disk (RAID) system, a disk device, or a storage unit. In the example, the host computer 1 is separated from the storage system 2. However, the host computer 1 and the storage system 2 may be configured as one unit. In this example, although the disk device is used as an example, a compact disk, a digital versatile disk (DVD), or a memory may also be used for the disk device.

The disk access controller 23 is a processing portion to control access to each magnetic disk device under the primary storage system 2. The update processing portion 30 is a processing portion in which when the received access request is a write request, it is determined whether or not the contents of the write request are log information indicating the contents of the database processing executed in the database buffer 12 of the primary host computer 1. If the write contents are the log information, the portion 30 converts position information indicated in the log information into physical position information in the primary storage system 2 using the database—disk block conversion table 28. The portion 30 updates data in a database area 24 of the primary storage system 2 represented by the converted physical position information according to the contents of the log information. The data transmission processing portion 31 is a processing portion to transmit the access request to the storage system 4 as a secondary storage system.

The program to operate the primary storage system 2 as the disk control processing portion 21, the disk access controller 23, the update processing portion 30, and the data transmission processing portion 31 is recorded on a recording medium such as a floppy disk for execution thereof. The recording medium to record the program may be a recording medium other than the floppy disk. The program may be installed for use from the recording medium in an information processor. Or, the system may access the recording medium via a network to use the program.

The secondary storage system 4 includes a data reception processing portion 32, a disk control processing portion 41, a disk access controller 43, and an update processing portion 50.

The data reception processing portion 32 is a processing portion to receive an access request, which is sent from the primary host computer 1 to the primary storage system 2, via a storage area network 29 from the primary storage system 2.

The disk control processing portion 41 is a control processing portion to control processing to determine whether or not the received access request is a write request or a read request and to control overall operation of the constituent components of the secondary storage system 4. The disk access controller 43 is a processing portion to control access to each magnetic disk device under the secondary storage system 4.

The update processing portion 50 is a processing portion in which when the received access request is a write request, it is determined whether or not the contents of the write request are the log information. If the write contents are the log information, the portion 50 converts position information indicated in the log information into physical position information in the secondary storage system 4 using the database—disk block conversion table 48 indicating a correspondence between logical position information recognized in the database processing by the primary host computer 1 and physical position information in the secondary storage system 4. The portion 50 updates data in a database area 44 of the secondary storage system 4 represented by the converted physical position information according to the contents of the log information.

The program to operate the secondary storage system 4 as the data reception processing portion 32, the disk control processing portion 41, the disk access controller 43, and the update processing portion 30 is recorded on a recording medium such as a floppy disk for execution thereof. The recording medium to record the program may be a recording medium other than the floppy disk. The program may be installed for use from the recording medium in an information processor. Or, the system may access the recording medium via a network to use the program.

In the discovery system of the embodiment, the primary host computer 1 of the primary system is connected via the storage area network 29 to the primary storage system 2, and the secondary host computer 3 of the secondary system is connected to the secondary storage system 4 also via the storage area network 29.

In the primary host computer 1, the database management processing portion 10 of the primary system operates. The computer 1 includes a database buffer 12 to temporarily keep the contents of the database area 24 of the primary storage system 2 and a log buffer 14 to temporarily keep the contents of update processing for the database buffer 12.

In the primary storage system 2, the database area 24 of the magnetic disk device is accessed via the disk control processing portion 21 operating in response to reception of an instruction from the primary host computer 1, the cache memory 22, and the disk access controller 23. The disk access is conducted via the cache memory 22 in any situation.

In the embodiment, the log information, namely, update history information of data updated by a transaction operating in the database management processing portion 10 of the primary host computer 1 is written in the log block 262a. At completion of the transaction, when it is required to force the contents of the database buffer 12 in the primary storage system 2, the log block 262a is written in the system 2.

When the data write operation is finished, the update processing portion 30 of the embodiment determines whether or not the data is the log block 262a to control writing of a database block 242a in the primary storage system 2.

That is, the update processing portion 30 analyzes the command received by the primary storage system 2. If the command is a write request of the log block 262a, the portion 30 analyzes the log block 262a written in the cache memory 22 and uploads in the cache memory 22 the database block 242a of the database area 24 associated with the log record in the log block 262a and then executes processing to force the contents of the log.

The database block 242a in which the contents are to be forced is represented by logical position information in the log record of the log block 262a, the information being recognizable by the database management processing portion 10 of the primary host computer 1. Therefore, it is required to map the logical position information onto physical position information of the primary storage system 2. For this purpose, the processing is executed using the database—disk block conversion table 28. In general, the table 28 is created by the database management processing portion 10 of the primary host computer 1 when the database is constructed.

FIG. 2 shows layout information of the database—disk block conversion table 28 of the embodiment. As shown in FIG. 2, each entry of the table 28 includes a database area identifier as information to identify the database area, a file identifier indicating a sequential number of a file when the database area identified by the database area identifier includes a plurality of files, a block length indicating length of a block constituting the database area, a logical volume identifier as information to identify a logical volume reserving the constituent files of the database area, a disk controller number as a number to identify a storage system onto which the logical volume identified by the logical volume identifier is mapped, a physical device identifier as information to identify a drive number of a magnetic disk device onto which the logical volume is mapped, the disk device being selected from the magnetic disk devices of the storage system identified by the disk controller number, and a relative position indicting a relative position of the file in the magnetic disk device identified by the physical device identifier.

The files constituting the database area 24 are mapped onto logical volumes as a file system recognized by the operating system of the primary host computer 1. The logical volume is mapped as a device file corresponding to a magnetic disk device as a physical device of the primary storage system 2.

In the primary storage system 2, each device file corresponds to a logical unit (LU). Therefore, the files constituting the database area 24 are finally mapped onto physical devices, namely, magnetic disk devices. Associated physical information of each magnetic disk device includes a physical device identifier to identify a physical device of the primary storage system 2 and a logical block address (LBA) as a relative position in the physical device.

Figure 3:
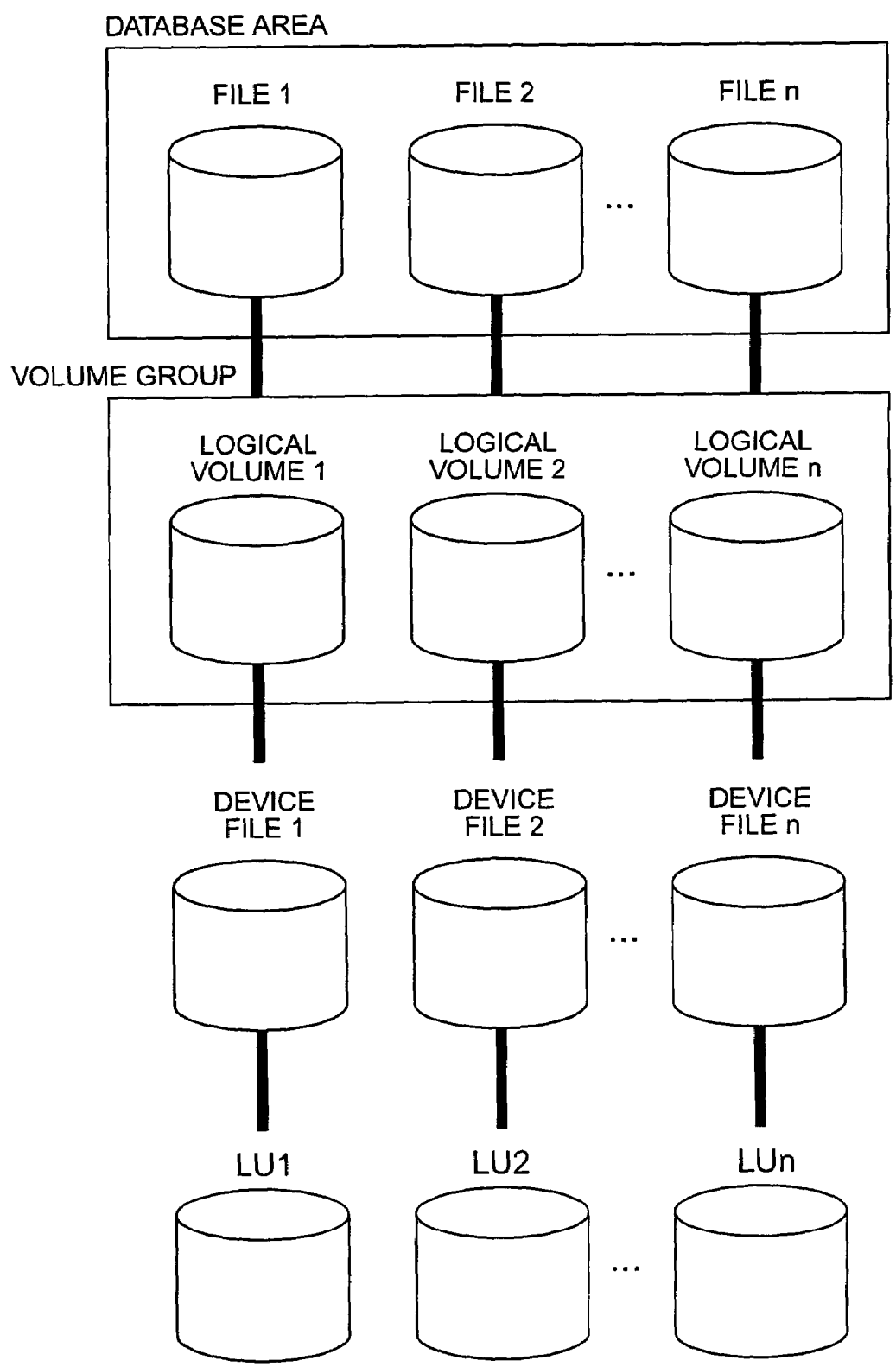
FIG. 3 is a diagram showing an example of mapping of a database area recognized by a host computer in a first embodiment, logical volumes recognized by an operating system, device files, and logical units in a storage system.

FIG. 3 is shows an example of mapping of a database area recognized by a host computer in the embodiment, logical volumes recognized by the operating system, device files, and logical units in the storage system. In the database management processing portion 10 shown in FIG. 3, the database area to store data is assumed to include a plurality of files. Each constituting file corresponds to a file of an operating system of the primary host computer 1. In FIG. 3, it is assumed that the file is recognized as a RAW device by the operating system. The file of the operating system is managed as a device file corresponding to a physical magnetic disk device. The device file is mapped onto a logical unit corresponding to each magnetic disk of the primary storage system 2 as described above.

On the other hand, the system of the secondary system is similarly configured. It is assumed that the primary storage system 2 is connected via the storage area network 29 to the secondary storage system 4. However, in a wait state, the secondary host computer 3 is not operating. The secondary storage system 4 receives log information via the storage area network 29 from the primary storage system 2 and conducts update processing for the database area 4.

It is assumed that the database—disk block conversion table 48 of the secondary storage system 4 is configured in the same way as for the database—disk block conversion table 28 of the primary storage system 2. However, the disk controller number, the physical device identifier, and the relative position of the table 48 respectively store a number to identify the secondary storage system 4, a drive number of a magnetic disk device of the secondary storage system 4, and relative position information of each file in the magnetic disk device.

Referring next to the flow charts of FIGS. 4 to 7, description will be given of processing of an access request from the database management processing portion 10 of the primary host computer 1 to write the log block 262a of the log buffer 14 in the primary storage system 2. First, an outline of the processing will be described by referring to FIG. 4.

Figure 4:
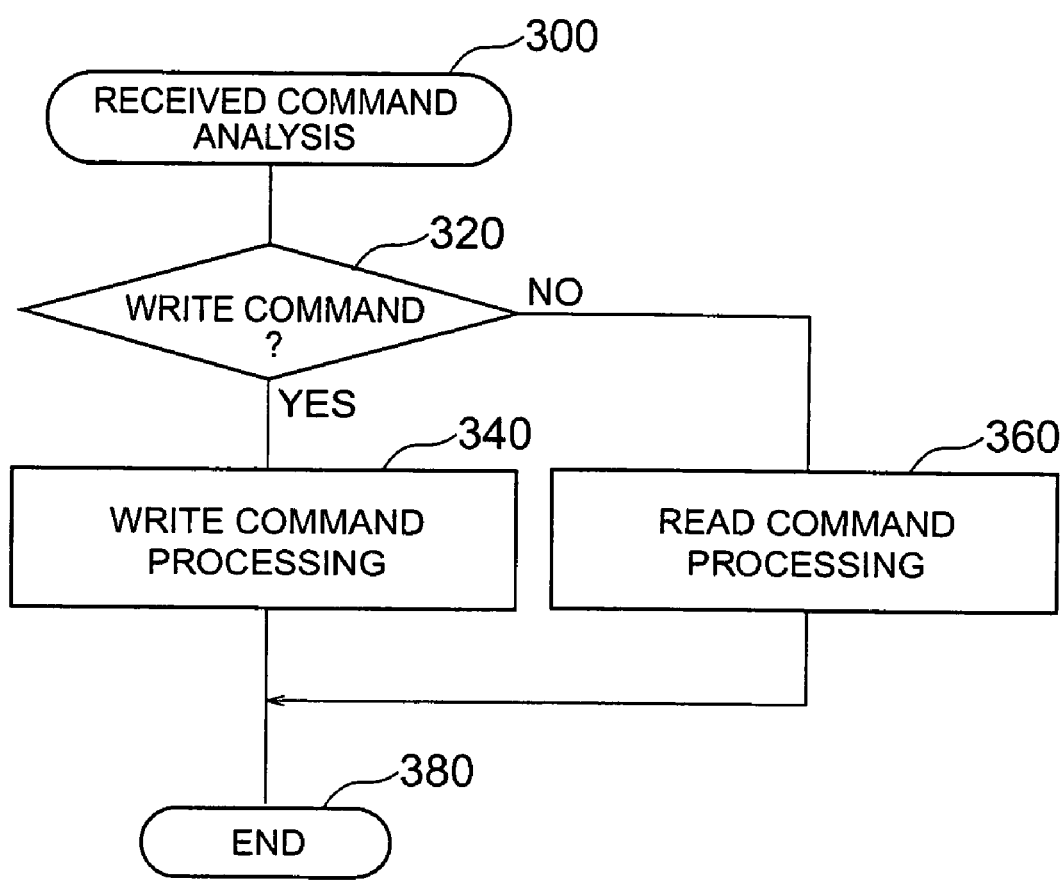
FIG. 4 is a flow chart showing a processing procedure of received command analysis processing in a first embodiment.

FIG. 4 shows in a flow chart a processing procedure of received command analysis processing in the embodiment. The processing of FIG. 4 is implemented as processing of the disk control processing portion 21 executed by a processor of the primary storage system 2. Having received an access request from the primary host computer 1, the primary storage system 2 first executes processing to analyze the received command (Step 300). It is assumed that the access request can be determined as a READ command or a WRITE command by analyzing the command according to a protocol of the connection channel.

In Step 320, the disk control processing portion 21 determines whether or not the received command is a WRITE command. If the command is a WRITE command, the portion 21 executes WRITE command processing (Step 340). If the command is a READ command, the portion 21 executes READ command processing (Step 360).

Figure 5:
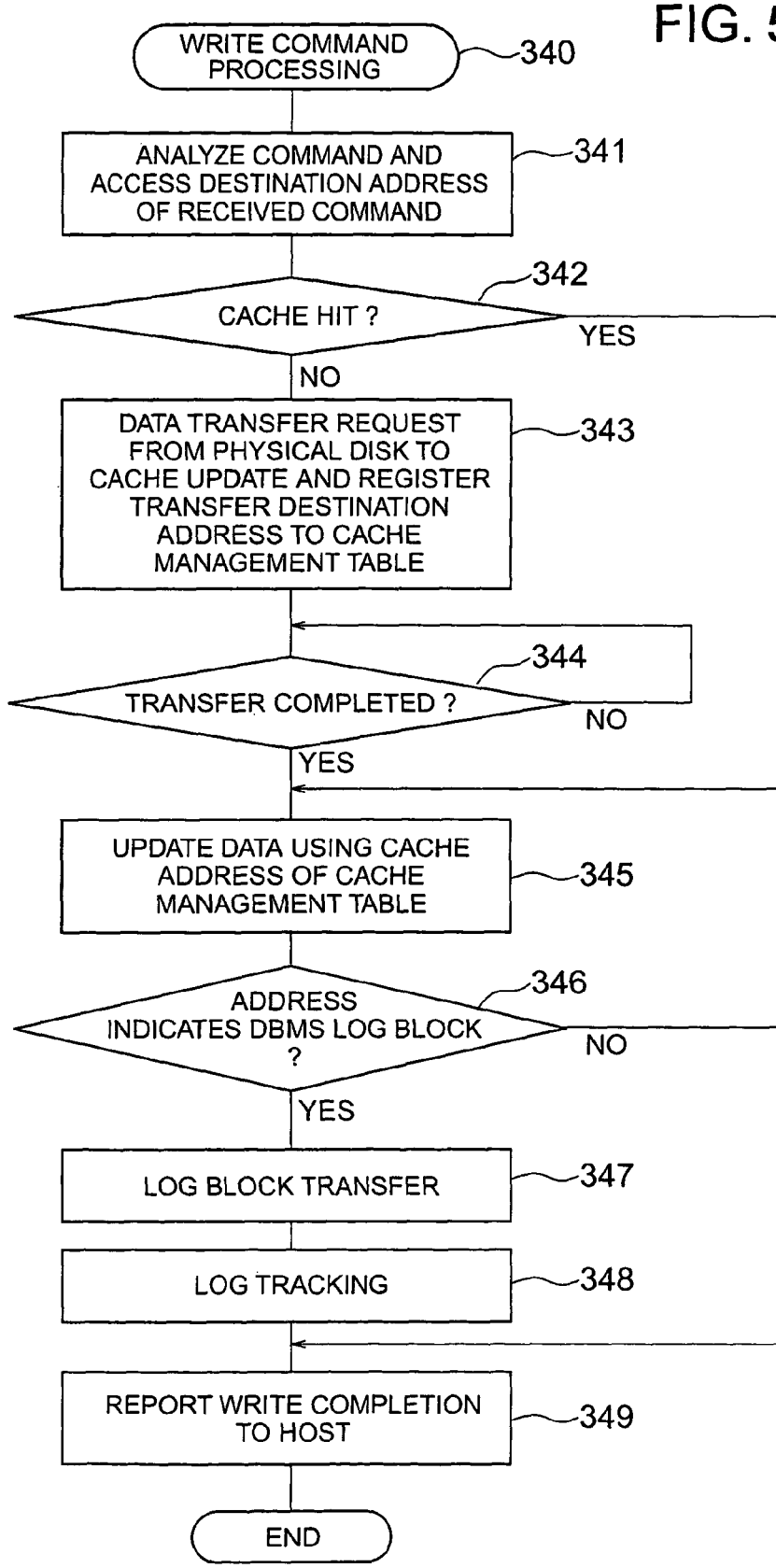
FIG. 5 is a flow chart showing a processing procedure at reception of a WRITE command in a first embodiment.

FIG. 5 is a flow chart showing a processing procedure at reception of a WRITE command in the embodiment. As shown in FIG. 5, when a command is received from the disk control processing portion 21, the update processing portion 30 of the primary storage system 2 analyzes a command type and an access destination address of the received command to recognize that the command is a WRITE command (Step 341). It is assumed that a disk controller number and a drive number can be identified according to the access destination address through comparison with information of a device configuration management table indicating a plurality of storage systems and addresses assigned to the magnetic disks of the storage systems.

Next, a check is made to determine whether or not data of the access destination address thus analyzed in Step 341 is kept in the cache memory 22 of the primary storage system 2 for decision of a cache hit miss (Step 342).

In a cache miss in which the data of access destination is not kept in the cache memory 22, the update processing portion 30 identifies a drive number of the access request destination as described above and then issues a transfer request to the disk access controller 23 of the primary storage system 2 to transfer data from a magnetic disk device corresponding to the drive number to the cache memory 22 (Step 343). In this operation, the WRITE processing is interrupted until the transfer is finished (Step 344). After the transfer is finished, the WRITE processing is resumed. The cache address as the transfer destination is managed and is acquired in a general method, for example, using a cache free list. However, it is required that the transfer destination address is registered by updating the cache management table.

If Step 342 results in a cache hit or if the transfer processing is completed in Step 344, the data is updated in the cache memory 22 of the primary storage system 2 (Step 345). That is, the contents of data received from the primary host computer are written in the cache memory 22.

When the data update is finished, a check is made to determine whether or not the access destination address is an address in a log disk 26 for log to determine whether or not the data is data for the log disk 26 in the database processing (Step 346). If the write contents are data to the log disk 26, namely, a log block, the log block is transferred via the data transmission processing portion 31 to the secondary storage system 4 (Step 347). Thereafter, according to the contents of the log block, log tracking processing is executed for the database block of the database area 24 (Step 348).

When the log tracking processing is completed or when it is determined in Step 346 that the write contents are other than a log block, a report of completion of WRITE command processing is sent to the primary host computer 1 (Step 349).

Figure 6:
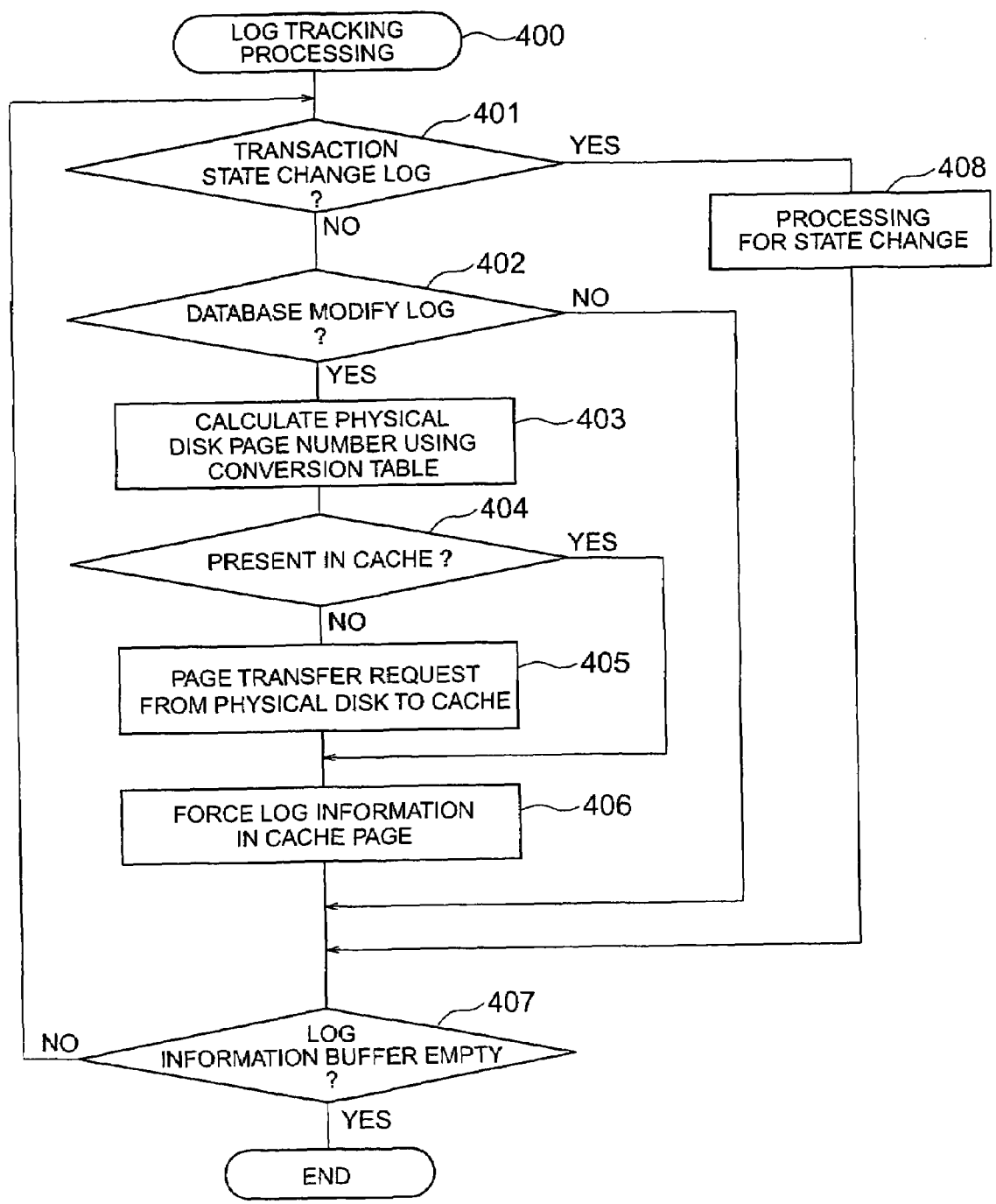
FIG. 6 is a flow chart showing a processing procedure of log tracking processing in a first embodiment.

FIG. 6 is a flow chart showing a processing procedure of log tracking processing in the embodiment. The log block includes a plurality of log records. Therefore, as shown in FIG. 6, the processing is sequentially executed for the log records of the log block.

First, the update processing portion 30 determines whether the log information of the log record is information indicating transaction start processing or transaction completion processing such as "COMMIT" or "ROLLBACK" (Step 401).

If the log record is other than a transaction state change log, a check is made to determine whether or not the log record is a transaction modify log indicating database modify history (Step 402).

If the log record is a transaction modify log, the update processing portion 30 refers to the database—disk block conversion table 28 shown in FIG. 28 to identify a disk controller number, a drive number, and a page number of an associated physical disk using the database area identifier, the file identifier, and the page number of the log information recorded in the log record (Step 403). That is, the portion 30 searches the table 28 for a record according to the database area identifier and the file identifier in the log information to obtain the disk controller number, the drive number, and the relative position. Assuming the relative number as a start position of file, the portion 30 converts the page number of the log information into a page number on the physical disk.

Next, the update processing portion 30 makes a check in Step 403 to determine whether the data identified above is kept in the cache memory 22 for decision of a cache hit miss (Step 404). If the data is not kept in the cache memory 22, namely, if a cache miss results, the portion 30 requests the disk access controller 23 to transfer the database block from the drive to the cache memory 22 (Step 405).

When a cache hit results for the database block in Step 404 or when the transfer processing is completed in Step 405, the portion 30 forces database modify history information of the log record in the database block of the cache memory 22 (Step 406).

On the other hand, when the log record is a transaction state change log and is a rollback log, the update processing portion 30 executes processing in Step 408 to cancel the force of the update history information by the transaction.

In Step 407, the portion 30 makes a check to determine whether or not all log records of the log block have been processed. If there remains any log record to be processed, the portion 30 passes control to Step 401. Otherwise, the portion 30 terminates the processing.

Figure 7:
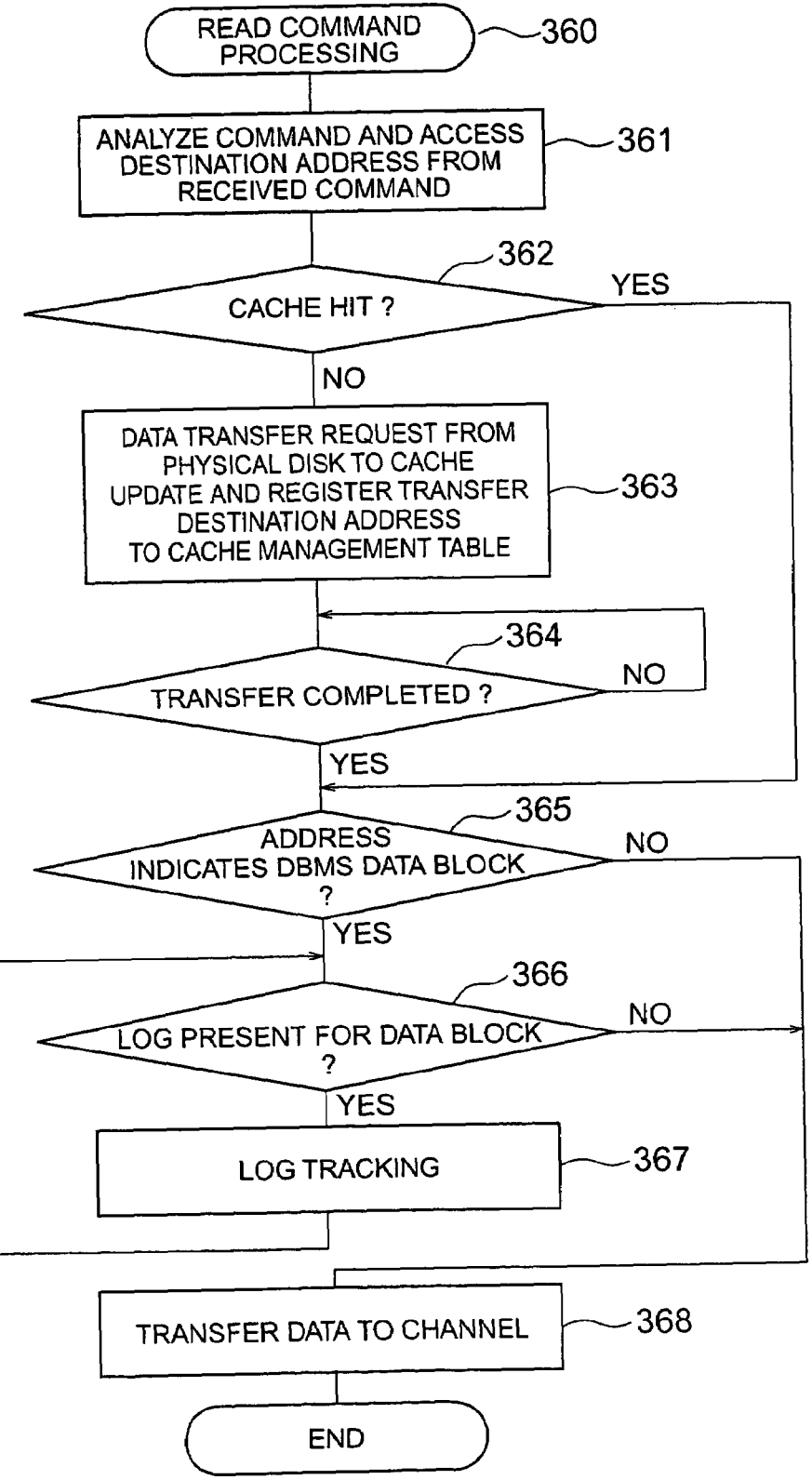
FIG. 7 is a flow chart showing a processing procedure at reception of a READ command in a first embodiment.

FIG. 7 shows in a flow chart a processing procedure at reception of a READ command in the embodiment. As shown in FIG. 7, when a command is received from the disk control processing portion 21, the update processing portion 30 analyzes a command type and an access destination address of the received command to recognize that the command is a READ access request (Step 361). It is assumed that by referring to the device configuration management table using the access destination address, a disk controller number and a drive number of the access request destination can be identified as above.

Next, the update processing portion 30 makes a check to determine whether or not data of the access destination address analyzed in Step 361 is kept in the cache memory 22 of the primary storage system 2 for decision of a cache hit miss (Step 362).

If the access destination data is not kept in the cache memory 22, namely, if a cache miss results, the portion 30 identifies the drive number of the access request destination as above and then requests the disk access controller 23 of the primary storage system 2 to transfer data from a magnetic disk device corresponding to the drive number to the cache memory 22 (Step 363). In this case, the portion 30 interrupts the READ processing until the transfer operation is finished (Step 364). After the transfer processing is terminated, the portion 30 resumes the READ processing. The cache address of the transfer destination may be managed and acquired in a general method, for example, using a cache empty list. However, the transfer destination address must be registered by updating the cache management table.

When a cache hit occurs in Step 362 or when the transfer processing is terminated in Step 364, data is transferred from the cache memory of the storage system to an associated channel in a simple data reading operation of the related art. However, in the embodiment, the portion 30 makes a check to determine whether or not the data is associated with a READ request of a database block from the database management processing portion 10 (Step 365). Whether or not the data is a database block can be identified by referring to the database—disk block conversion table 28 to judge presence or absence of the drive number.

If the data is other than a database block, a check is made to determine whether or not log information which has been received by a preceding WRITE request and for which log tracking processing has not been completed includes a log record to update the database block. If the log record is present, the portion 30 updates the database block.

That is, the update processing portion 30 acquires a drive number and a page number of a physical drive as the READ access request destination using the access destination address. The portion 30 compares the drive number and the page number respectively with a drive number and a page number of a physical drive of a log record for which the log tracking processing has not been completed to determine presence or absence of a log record to be forced in the log records of the log block 262a in the cache memory 22 (Step 366). If such a log record is present, the portion 30 executes the log tracking processing (Step 367).

Thereafter, if it is determined in the processing of Step 365 that the data is other than a database block or if the log tracking processing is completed in Step 367, the portion 30 transfers the data to the channel.

In the embodiment, when an access request sent from the primary host computer 1 to the primary storage system 2 is transmitted via the storage area network 29 from the primary storage system 2 to the secondary storage system 4, it is also possible that after the data reception processing portion 32 receives the access request, the secondary storage system 4 executes processing similar to that of the primary storage system 2. The disk control processing portion 41 then makes a check to determine whether or not the received access request is a WRITE request or a READ request to thereafter execute the WRITE or READ command processing. However, as described in conjunction with Step 347 of FIG. 5, in a case in which the access request sent from the primary host computer 1 to the primary storage system 2 is prepared such that only a WRITE request of log information is to be transmitted to the secondary storage system 4, it is also possible that immediately after reception of the access request by the data reception processing portion 32, the update processing portion 30 modifies the database area 44 of the secondary storage system 4 according to the contents of the log information. Next, the WRITE command processing will be described.

Figure 8:
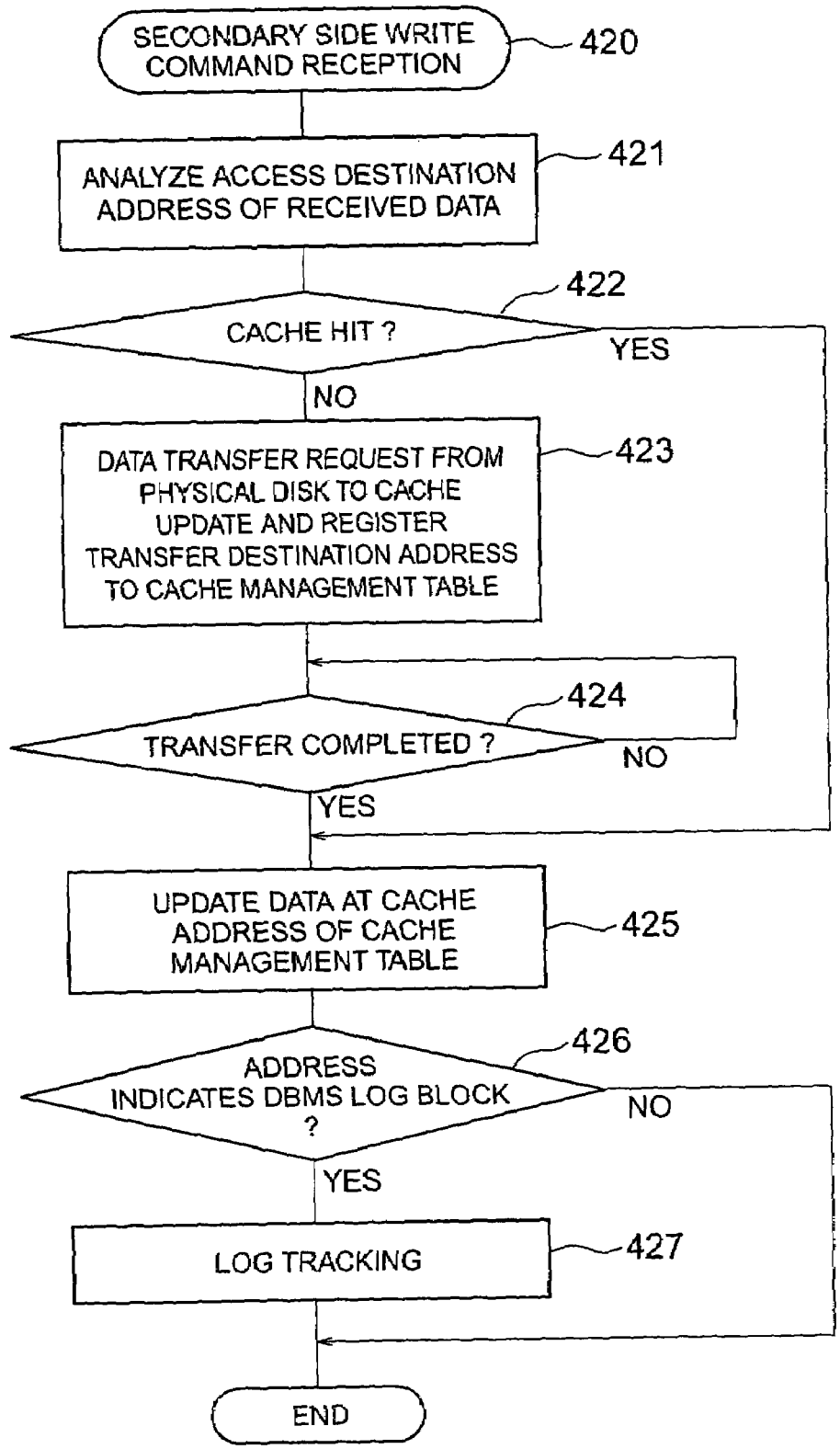
FIG. 8 is a flow chart showing a processing procedure of WRITE command receiving processing in a secondary storage system in a first embodiment.

FIG. 8 is a flow chart showing a processing procedure of WRITE command receiving processing in the secondary storage system of the embodiment. As shown in FIG. 8, when a command is received from the data reception processing portion 32, the update processing portion 30 of the secondary storage system 4 analyzes a command type and an access destination address of the received command to recognize that the command is a WRITE command (Step 421). It is assumed that by comparing information of the device configuration management table indicating a plurality of storage systems and addresses assigned to the magnetic disk devices of the system according to the access address, the secondary storage system 4 also can identify a disk controller number and a drive number of the access request destination.

Next, the update processing portion 30 judges to determine whether or not data of the access destination address analyzed in Step 421 is kept in the cache memory 42 of the secondary storage system 4 for decision of a cache hit miss (Step 422).

If the access destination data is not kept in the cache memory 42, namely, if a cache miss results, the portion 30 identifies the drive number of the access request destination as above and then requests the disk access controller 43 of the secondary storage system 4 to transfer data from a magnetic disk device corresponding to the drive number to the cache memory 42 (Step 423). In this case, the portion 30 interrupts the READ processing until the transfer operation is finished (Step 424). After the transfer processing is terminated, the portion 30 resumes the READ processing. The cache address of the transfer destination may be managed and acquired in a general method, for example, using a cache empty list. However, the transfer destination address must be registered by updating the cache management table.

When a cache hit occurs in Step 422 or when the transfer processing is terminated in Step 424, the portion 30 updates the data (Step 425). That is, the portion 30 writes the data received from the primary storage system 2 in the cache memory 42.

After the data is completely updated, the portion 30 judges to determine whether or not the access destination address is an address in a log disk 46 to determine whether or not the data is associated with the log disk 46 in the database processing (Step 426). If the write contents are data for the log disk 46, namely, a log block, the portion 30 executes the log tracking processing for the database block of the database area 44 according to the contents of the log block (Step 427). The log tracking processing is the same as for the primary storage system 2.

In the embodiment, data in the database area 44 of the secondary storage system 4 is updated using the log information indicating the contents of the update processing for the database buffer 12 as described above. Therefore, the WRITE operation of the database block conducted in the disaster recovery system of the related art between the primary and secondary host computers and between the primary and secondary storage systems is not required in the embodiment. As a result, the primary host computer 1 can instantaneously terminates the processing to force the contents of the database buffer 12 in the secondary storage system 4 according to the embodiment. While the data in the database area 44 of the secondary storage system 4 is being updated using the log information, the primary host computer 1 can continuously execute the database processing.

Therefore, the primary storage system 2 and the secondary storage system 4 can concurrently execute the log tracking processing.

In the operation, absence of the access objective data in the database buffer 12 is detected during the continuous execution of the database processing by the primary host computer 1 and a READ request of a database block is issued to the primary storage system 2. The database block of the read request is updated according to the contents of the log information and is then sent to the primary host computer 1. Therefore, it is possible that the computer 1 can continue the database processing without considering the log tracking processing in the primary storage system 2 and the secondary storage system 4.

In the embodiment, it is not required that the primary host computer 1 writes the database block in the secondary storage system 4. Consequently, there can be obtained an advantage similar to that obtained by remarkably increasing the bandwidth for the secondary storage system 4. That is, in the embodiment, when it is required to force the contents of the database buffer 12 in the database area 44 of the secondary storage system 4, the database block 242a including at least one record updated as above is not entirely sent to the secondary storage system 4, but the log block 262a indicating the contents of the update processing for the database buffer 12 is sent to the storage system 4. Therefore, the amount of data sent to the storage system 4 can be reduced and hence the bandwidth for the storage system 4 can be relatively increased.

On the other hand, even when the database management processing of the primary host computer 1 or the primary storage system 2 fails in the primary system, the cache memory 42 of the secondary storage system 4 is in the warm cache state keeping the state of the most recent database block 442. Therefore, when an input/output request is issued from the secondary host computer 3 to the secondary storage system 4 in the disaster recovery processing, a cache hit occurs, and hence the frequency of actual accesses to the database area 44 of the magnetic disk device can be extremely reduced.

According to the embodiment of the disaster recovery system described above, the database area of the secondary storage system is updated using the log information sent from the host computer to the primary storage system. Therefore, when the contents of the database processing executed for the buffer of the host computer are forced in the database area of the secondary storage system, the load of input/output processing between the host computers and between the storage systems can be reduced.

Second Embodiment

Description will now be given of a second embodiment of the disaster recovery system executing the update processing using particular log information, namely, log information of a committed transaction.

In the log tracking processing of the first embodiment, all log records are forced in the pertinent database blocks. However, in conjunction with the second embodiment, description will be given of another method of executing the log tracking processing by referring to FIGS. 9 to 11. In the following paragraphs, the log tracking processing of the primary storage system 2 will be described. However, it is assumed that the log tracking processing of the secondary storage system 4 is similarly executed.

Figure 9:
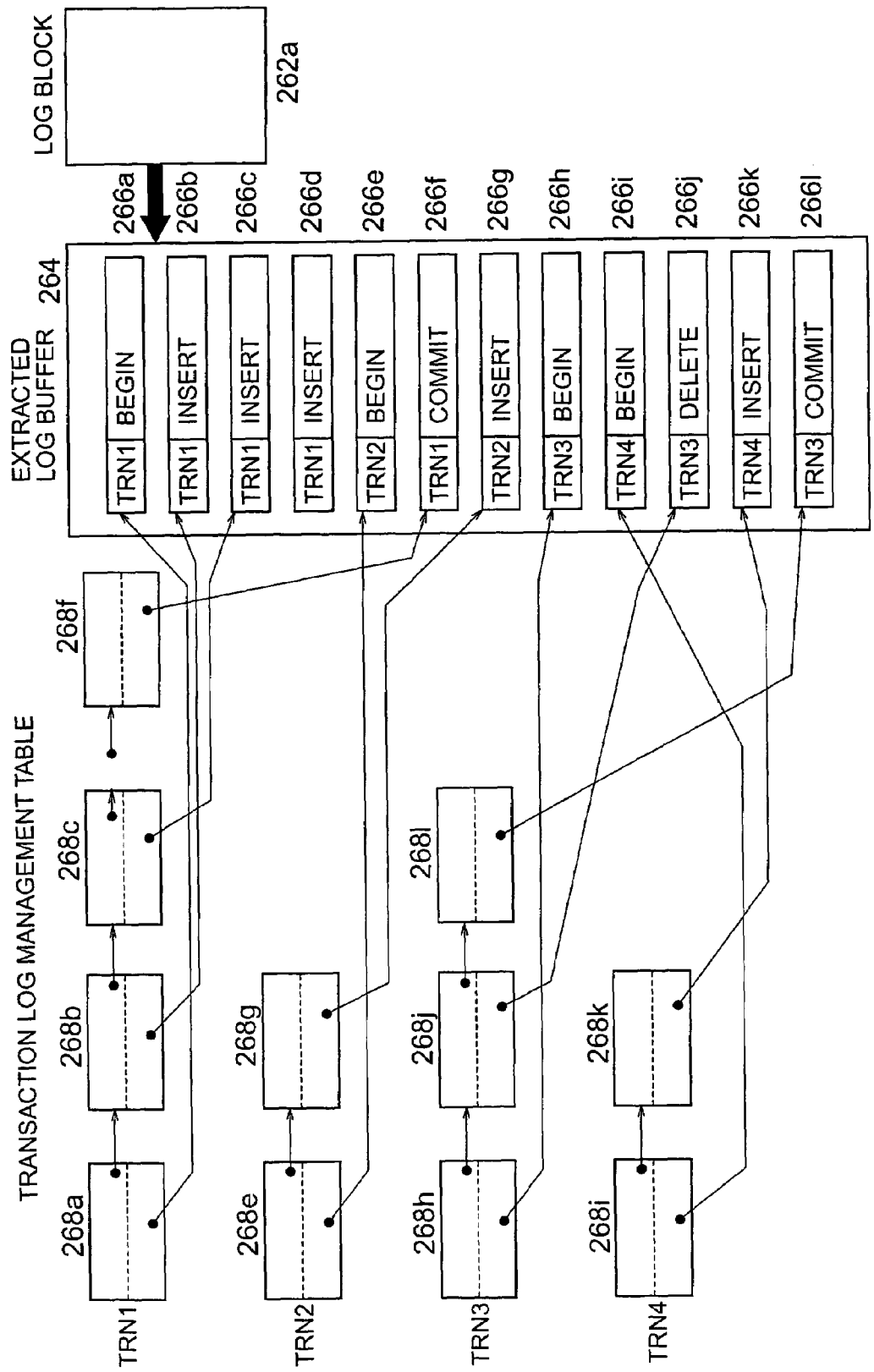
FIG. 9 is a diagram showing an example of results of log analysis for each transaction using all log records of log blocks in log tracking processing in a second embodiment.

FIG. 9 shows an example of results of log analysis for each transaction using all log records of the log blocks in the log tracking processing according to the embodiment. As shown in FIG. 9, the log block 262a is analyzed and a log buffer 264 is first reserved in a shared memory other than the cache memory 22 of the storage system to store log records 266a to 266l in the extracted log buffer 264 of the embodiment.

In this operation, the log records are managed according to each transaction, that is, the log records are managed for each transaction using a transaction log management table 268 to generate a chain of log records for each of the transactions, i.e., TR1 to TR4.

That is, transaction log management tables 268a, 268b, 268c, and 268f are chained to transaction TR1. Transaction log management tables 268e and 268g are chained to transaction TR2. Transaction log management tables 268h, 268j, and 268l are chained to transaction TR3. Transaction log management tables 268i and 268k are chained to transaction TR4.

By making a chain of transaction log management tables 268 for each transaction as above, only such a log record of a transaction for which the log record information indicates normal completion processing, i.e., "COMMIT" can be selected as an object of the processing.

Figure 10:
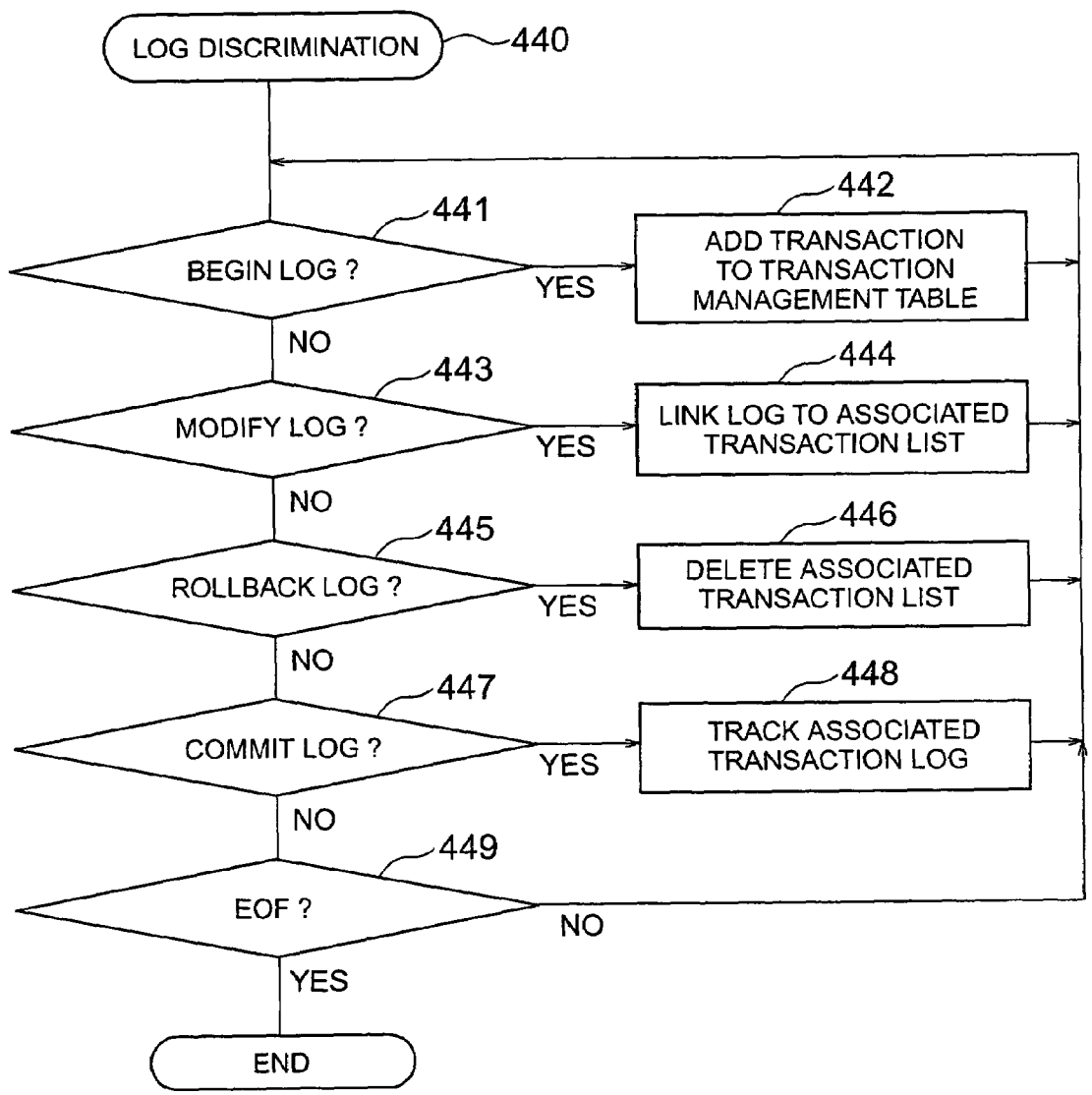
FIG. 10 is a flow chart showing a processing procedure of log record discrimination processing using a transaction log management table of FIG. 9 in the second embodiment.

FIG. 10 shows in a flow chart a processing procedure of log record discrimination processing using the transaction log management table of FIG. 9 in the embodiment. This processing replaces the WRITE command processing shown in Step 347 of FIG. 5.

For each log record in a log block, judgement is made to determine whether or not the record is a transaction BEGIN log to indicate a transaction start (Step 441). If the record is a transaction BEGIN log, the log is added to the extracted log buffer 264 to register the log to the transaction management table 268.

If it is determined in Step 441 that the record is other than a transaction BEGIN log, judgement is made to determine whether or not the record is a database modify log (Step 443). If the record is a database update modify log, the log record is chained to a last point of a transaction log management table 268 with a transaction identifier equal to that of the pertinent transaction.

If it is determined in Step 443 that the record is other than a transaction update log, judgement is made to determine whether or not the record is a transaction ROLLBACK log to indicate invalidation of the transaction (Step 445). If transaction ROLLBACK processing is indicated, a transaction log management table 268 with a transaction identifier equal to that of the pertinent transaction is deleted and an associated log record is also deleted from the extracted log buffer 264. That is, the log of the transaction thus rolled back is not forced in the database block.

If it is determined in Step 445 that the record is other than a transaction ROLLBACK log, judgement is made to determine whether or not the record is a transaction COMMIT log to indicate validity of the transaction (Step 447). If the record is a transaction COMMIT log, the log tracking processing is executed (Step 448).

If it is determined in Step 447 that the record is other than a transaction COMMIT log, Steps 441 to 449 are repeatedly executed until the end of log block is detected in Step 449.

Figure 11:
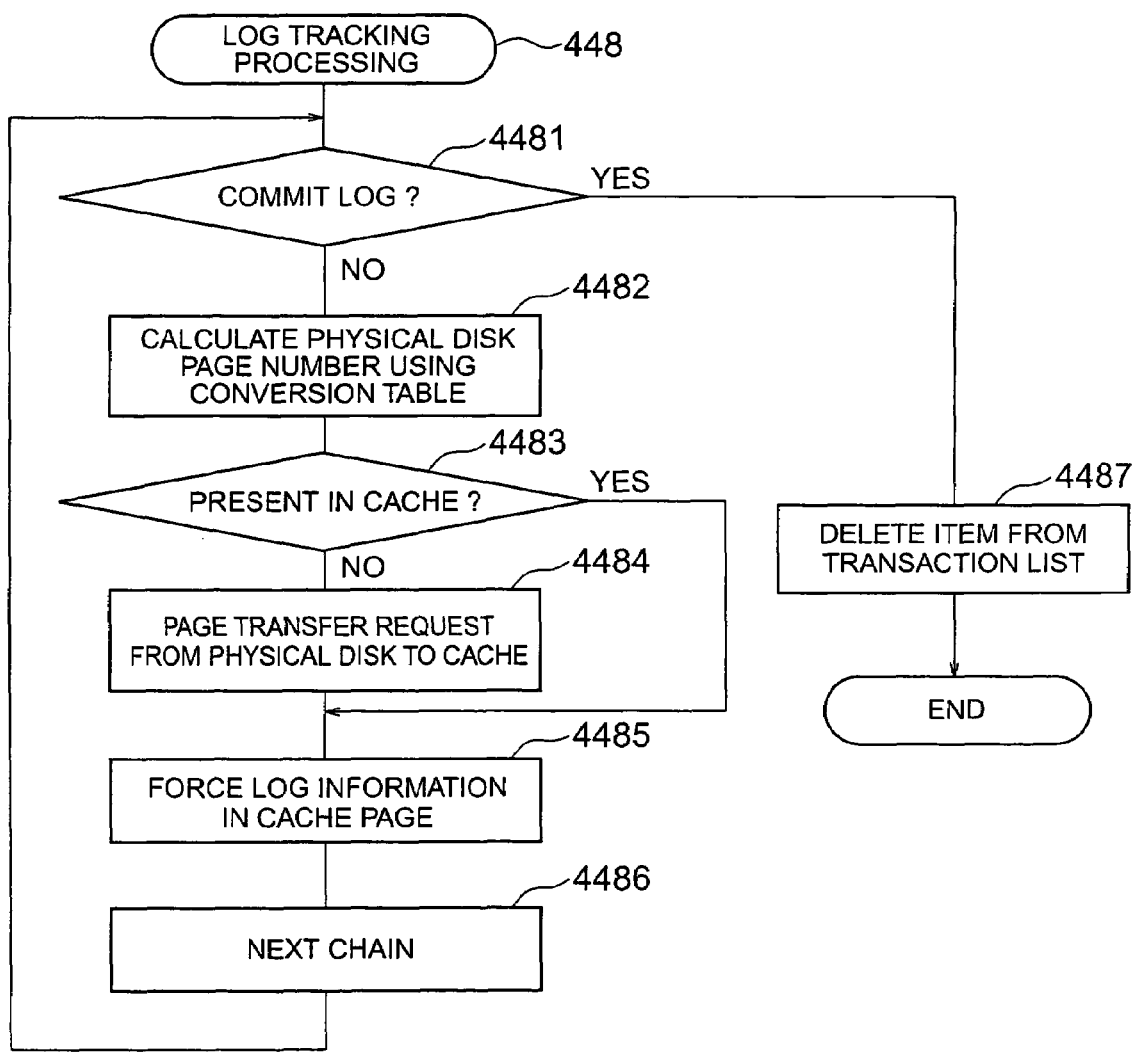
FIG. 11 is a flow chart showing a processing procedure of log record discrimination processing in Step 448 of FIG. 10 in the second embodiment.

FIG. 11 is a flow chart showing a processing procedure of log record discrimination processing in Step 448 of FIG. 10 in the embodiment. In the log tracking processing of FIG. 10, an address next to the first address of a transaction log management table 268 of the committed transaction is passed. That is, the transaction BEGIN log is deleted from the objects of the processing.

In the procedure, the processing is sequentially executed for each group of log records of one transaction. First, judgement is made in Step 4481 to determine whether or not log information of the log record is a transaction COMMIT log. If the log record is not a COMMIT log but a transaction update log, the database area identifier, the file identifier, and the page number in the log information recorded in the log record are compared with associated information items of the database—disk block conversion table 28 shown in FIG. 2 to identify a disk controller number, a drive number, and a page number of an associated physical disk (Step 4482).

Next, judgement is made to determine presence or absence of a cache hit miss in the cache memory 22 for the data identified in Step 4481 (Step 4483). In a cache miss in which the data is not kept in the cache memory, a transfer request is issued to the disk access controller 23 to transfer the database block from the drive to the cache memory 22 (Step 4484).

If a cache hit occurs for the database block in Step 4483 or if the transfer processing is terminated in Step 4484, database modify history information contained in the log record is forced in the database block of the cache memory 22 (Step 4485).

The processing of Steps 4481 to 4485 is repeatedly executed until all log records of the transaction are processed (Step 4486).

On the other hand, if a transaction COMMIT log is present as a result of the determination of Step 4481, the processing has been entirely forced for the logs of the transaction. Therefore, control goes to Step 4487 to delete all information regarding the transaction from the transaction log management table 268 and the transaction extracted log buffer 264.

In the embodiment, it is assumed that the log tracking processing of the primary storage system 2 is executed as above. The log tracking processing is similarly executed also in the secondary storage system 4.

According to the embodiment of the disaster recovery system described above, the update processing is executed using particular log information, namely, log information of a committed transaction. Therefore, when the contents of the database processing executed for the buffer of the host computer are forced in the database area of the secondary storage system using the log information, unnecessary input/output processing can be removed.

Third Embodiment

Next, description will be given of a third embodiment of the disaster recovery system in which the data items of the database areas are concurrently updated for respective physical devices corresponding to the data items of the database areas.

Figure 12:
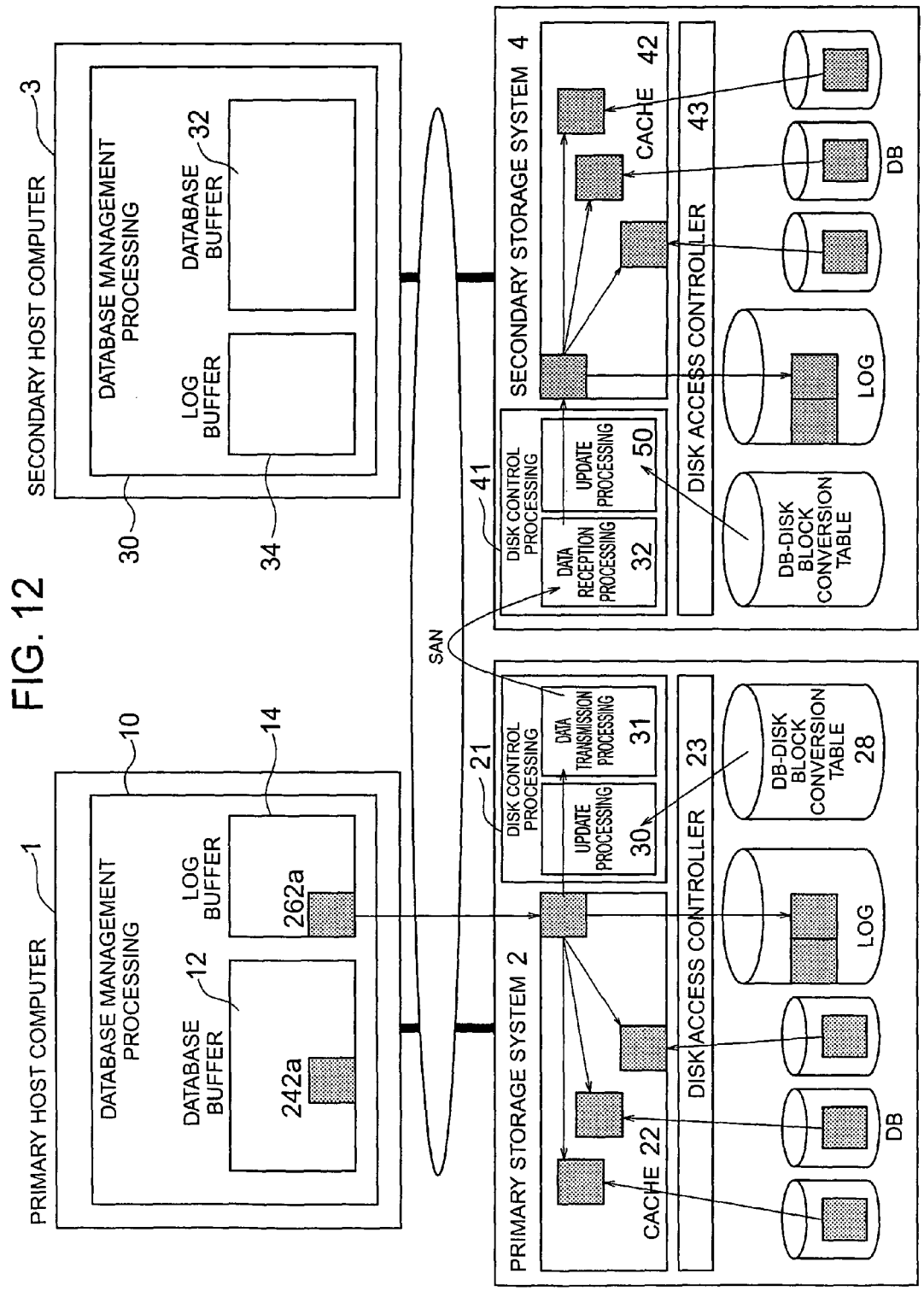
FIG. 12 is a diagram showing a general configuration of a third embodiment of a disaster recovery system.

FIG. 12 shows a general configuration of the embodiment of the disaster recovery system. The processing of the embodiment can be commonly implemented for the first and second embodiments. That is, in the log tracking processing of FIG. 6 for the first embodiment and that of FIG. 11 for the second embodiment, the primary storage system 2 obtains a drive number of a physical drive using the database—disk block conversion table 28 according to the database area identifier, the file identifier, and the page number of the database block and then distributes the processing to mutually different processors for the respective drives to execute the processing. As a result, the storage system 2 concurrently executes the WRITE processing in the cache memory 22. Similarly, the secondary storage system 4 also concurrently executes the log tracking processing. It is assumed that each storage system of the embodiment includes a plurality of processors to execute processing for each drive.

According to the embodiment of the disaster recovery system described above, the update processing of data in the database area is concurrently executed for each physical device corresponding to the data of the database area. Therefore, when the contents of the database processing executed for the buffer of the host computer are forced in the database area of the secondary storage system using the log information, the processing can be efficiently executed.

Fourth Embodiment

Next, referring to FIGS. 13 to 16, description will be given of a fourth embodiment of the disaster recovery system, as an alternative embodiment of the first embodiment, to transmit an access request including a read request to the secondary storage system.

Figure 13:
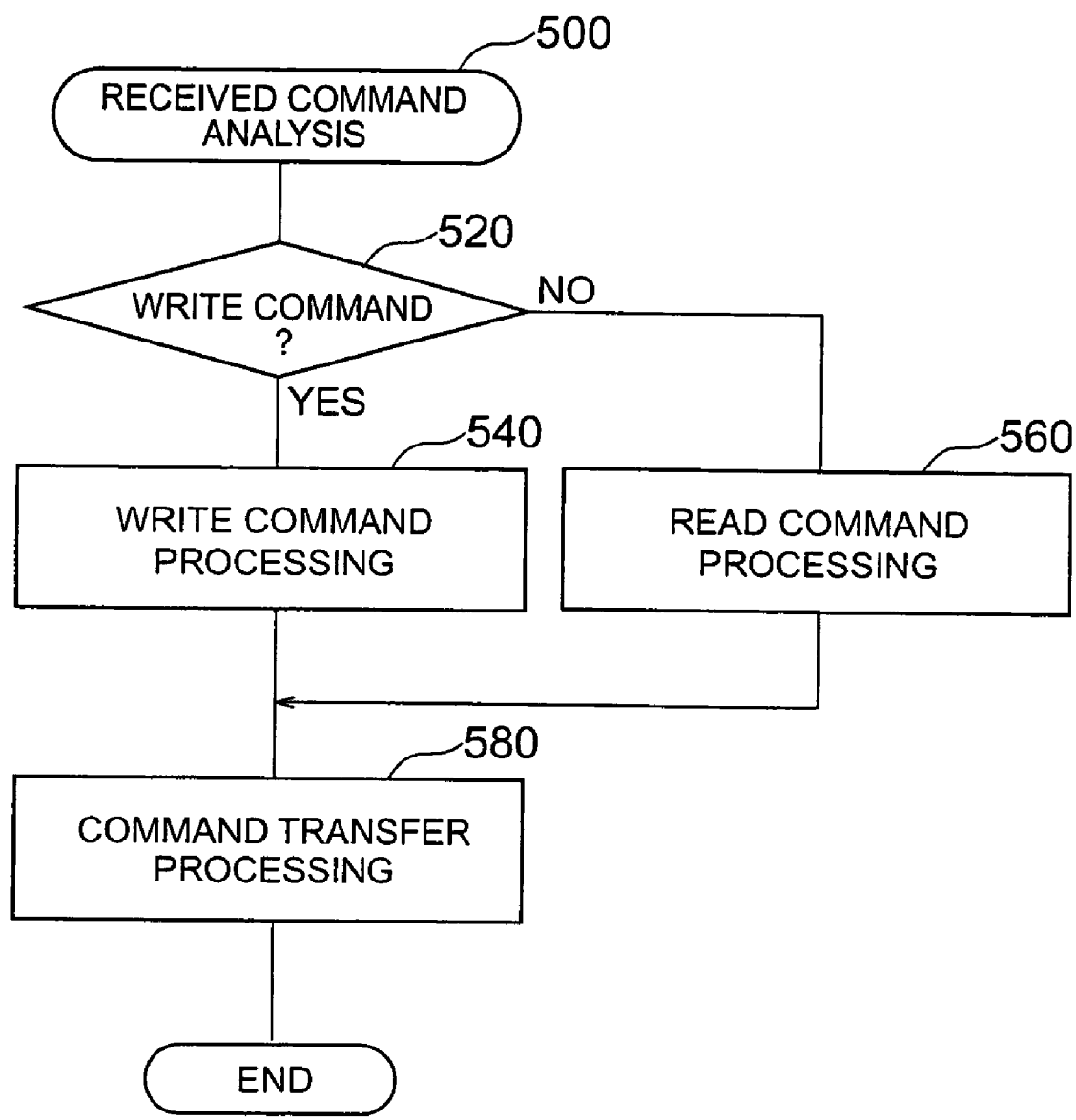
FIG. 13 is a flow chart showing a processing procedure of received command analysis processing in a fourth embodiment.

FIG. 13 shows in a flow chart a processing procedure of received command analysis processing in the embodiment. The processing shown in FIG. 13 is implemented as processing of the disk control processing portion 21 executed by a processor of the primary storage system 2. Having received an access request from the primary host computer 1, the primary storage system 2 first executes analysis processing for the received command (Step 500). It is assumed that whether the access request is a READ command or a WRITE command can be identified by analyzing the command according to the protocol of the connection channel.

In Step 520, the disk control processing portion 21 judges to determine whether or not the received command is a WRITE command. If the command is a WRITE command, the portion 21 executes WRITE command processing (Step 540). If the command is a READ command, the portion 21 executes READ command processing (Step 560). When the WRITE or READ command processing is completed, the portion 21 executes processing to transfer the access request via the data transmission processing portion 31 to the secondary storage system 4 (Step 580).

Figure 14:
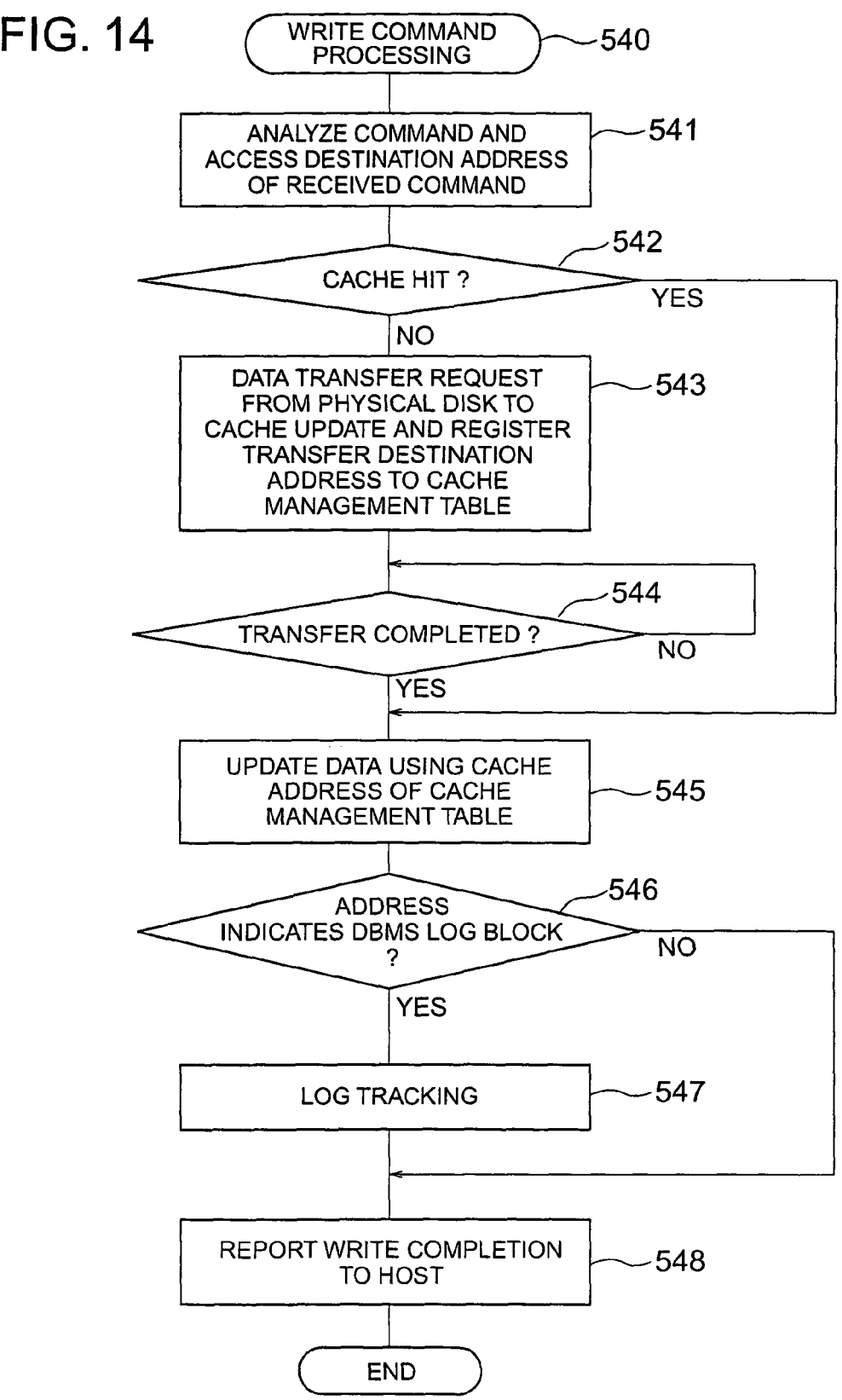
FIG. 14 is a flow chart showing a processing procedure of a WRITE command in a fourth embodiment.

FIG. 14 is a flow chart showing a processing procedure of WRITE command processing in the embodiment. As shown in FIG. 14, having received a command from the disk control processing portion 21, the update processing portion 30 of the primary storage system 2 analyzes a command type and an access destination address of the received command to recognize that the command is a WRITE command (Step 541). It is assumed that by comparing information of the device configuration management table indicating a plurality of storage systems and addresses assigned to magnetic disk devices of the system according to the access address, the update processing portion 30 can identify a disk controller number and a drive number of the access request destination.

Next, judgement is made to determine whether or not data at the access destination address analyzed in Step 541 is kept in the cache memory 22 of the primary storage system 2 for decision of a cache hit miss (Step 542).

In a cache miss in which the access destination data is not kept in the cache memory 22, the update processing portion 30 identifies a drive number of the access request destination as above and issues a transfer request to the disk access controller 23 of the primary storage system 2 to transfer data from a magnetic disk device corresponding to the drive number to the cache memory 22 (Step 543). In this case, the WRITE processing is interrupted until the transfer is completed (Step 544). After the transfer processing is terminated, the write processing is resumed. The cache address of the transfer destination may be managed and acquired in a general method, for example, using a cache empty list. However, the transfer destination address must be registered by updating the cache management table.

When a cache hit occurs in Step 542 or when the transfer processing is terminated in Step 544, the cache memory 22 of the primary storage system 2 is updated using the data (Step 545). That is, the contents of data received from the primary host computer 1 are written therein.

After the data update is completed, judgement is made to determine whether or not the access destination address is an address in the log disk 26 of the database processing (Step 546). If the write contents are data for the log disk 26, namely, a log block, log tracking processing is executed for the database block of the database area 24 according to the contents of the log block (Step 547).

When the log tracking processing is completed or when it is determined in Step 546 that the contents are not a log block, a completion report of the WRITE command processing is issued to the primary host computer 1 (Step 548).

Figure 15:
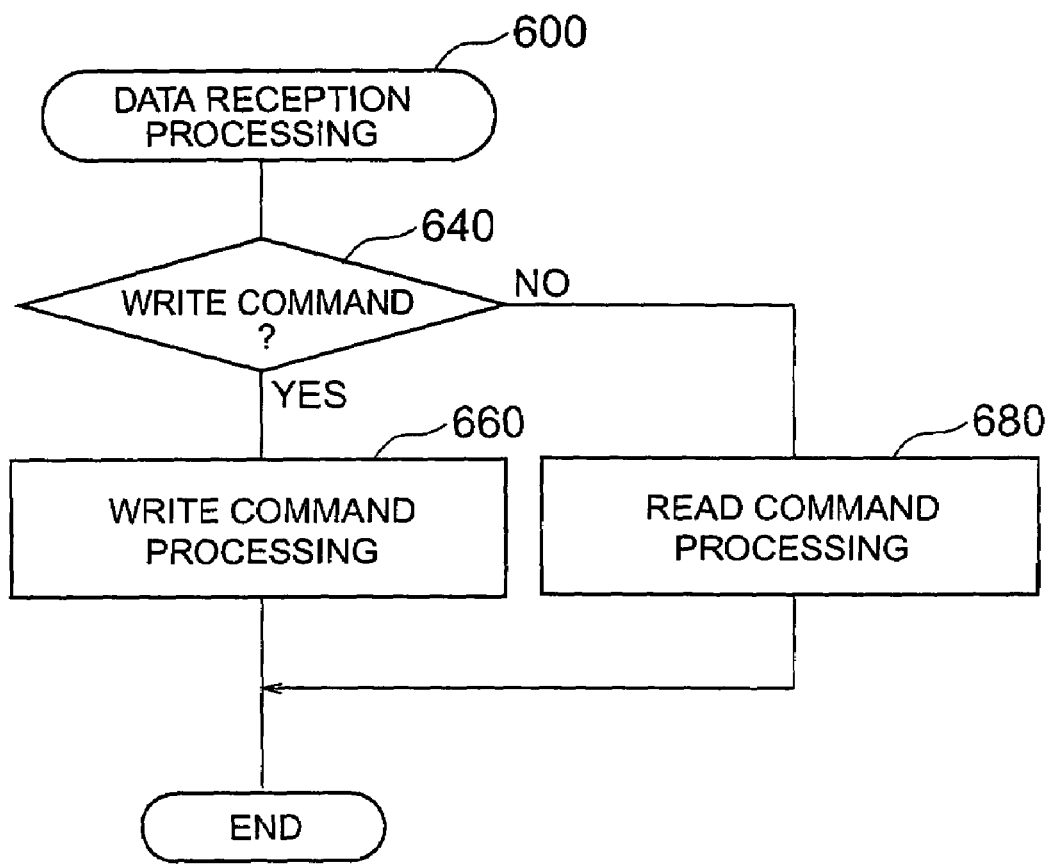
FIG. 15 is a flow chart showing a processing procedure of processing in which a command sent via a data transmission processing portion 31 of a primary storage system 2 of a fourth embodiment is received by a data reception processing portion 32 of a secondary storage system 4 to analyze the command.

FIG. 15 shows in a flow chart a processing procedure of processing in which a command sent via the data transmission processing portion 31 of the primary storage system 2 of the embodiment is received by the data reception processing portion 32 of the secondary storage system 4 to analyze the command. The processing shown in FIG. 15 is implemented as processing of the disk control processing portion 41 executed by a processor of the secondary storage system 4. Having received an access request from the primary host computer 1 via the primary storage system 2, the secondary storage system 4 first executes analysis processing for the received command (Step 600). It is assumed that the access request can be identified as a READ command or a WRITE command by analyzing the command according to the protocol of the connection channel.

In Step 620, the disk control processing portion 41 determines whether or not the received command is a WRITE command. If the received command is a WRITE command, the portion 41 executes WRITE command processing (Step 640). If the received command is a READ command, the portion 41 executes READ command processing (Step 660).

The flow of the WRITE command processing in the secondary storage system 4 is basically the same as that of the processing shown in FIG. 14 and hence description thereof will be avoided.

FIG. 16 is a flow chart showing a processing procedure of the READ command processing in the secondary storage system 4 of the embodiment. Having received a command from the disk control processing portion 41, the update processing portion 50 of the secondary storage system 4 analyzes a command type and an access destination address of the received command as in FIG. 16 to recognize that the command is a READ access request (Step 661).

It is assumed in the operation that by referring to the device configuration management table using the access destination address as in FIG. 7, the disk controller number and the drive number of the access request destination can be identified. However, since the READ command is originally a processing request to the primary storage system, it is required to convert the access destination into an access destination of the secondary storage system 4. For this purpose, a mapping conversion is conducted from a drive number and a relative position in the primary storage system 2 to a drive number and a relative position in the secondary storage system 4 (Step 662) to execute processing as below according to the converted access destination. It is assumed that a correspondence between a drive number and a relative position in the primary storage system 2 and a drive number and a relative position in the secondary storage system 4 is beforehand established in the device configuration management table.

Next, judgement is made to determine whether the data at the access destination address converted in Step 662 is kept in the cache memory 42 of the secondary storage system 4 for decision of a cache hit miss (Step 663).

In a cache miss in which the data of access destination is not kept in the cache memory 42, the update processing portion 50 identifies a drive number of the access request destination as described above and then issues a transfer request to the disk access controller 43 of the secondary storage system 4 to transfer data from a magnetic disk device corresponding to the drive number to the cache memory 42 (Step 664). In this operation, the WRITE processing is interrupted until the transfer is finished (Step 665). After the transfer is finished, the WRITE processing is resumed. The cache address as the transfer destination is managed and is acquired in a general method, for example, using a cache free list. However, it is required that the transfer destination address is registered by updating the cache management table.

If Step 663 results in a cache hit or if the transfer processing is completed in Step 665, the data is transferred from the cache memory of the storage system to an associated channel in a simple data READ operation according to the related art. However, the READ operation is not a READ request from the secondary host computer 3 in this case. Therefore, the data is kept in the cache memory 42 so that the warm cache state can be provided at occurrence of failure in the primary system (Step 666).

If the data is a database block, there may exist log information which is received according to reception of a preceding WRITE request and for which the log tracking processing has not been completed, the log information including a log record to update the database block. In this situation, the update of the database block is conducted by the log tracking processing being separately executed to retain the most recent warm cache state.

According to the embodiment of the disaster recovery system described above, since an access request including a READ request is sent to the secondary storage system, the database block as an object of the READ operation in the cache memory of the secondary storage system can be loaded to set the warm cache state.

What is described above is not limited to the database processing but is applicable to a system and/or a program which uses the log information as well as to a transaction monitor, a cluster program, and an operation system.

According to the present invention, the database area of the secondary storage system is updated according to the contents of the log information sent from the host computer to the primary storage system. Therefore, when the contents of the database processing executed on the buffer of the host computer are forced in the database area of the secondary storage system, it is possible to reduce the input/output processing load between the host computers and between the storage systems.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A database processing method for performing processing by which contents of database processing carried out on a computer are forced to a database in a storage unit connected through a network to said computer, comprising the steps of:
   receiving an access request received from said computer, and judging whether said received access request is a write request or a read request;
   judging whether contents to be written are log information of a plurality of log records indicating contents of database processing carried out on said computer when said received access request is a write request; and
   converting position information indicated in said log information, with reference to a conversion table indicating correspondence of logical position information recognized in said database processing on said computer, to physical position information in said storage unit when said contents to be written are said log information,
   wherein, when said received access request is a write request and said contents to be written are log information, said database processing method further comprises the steps of:
   chaining said plurality of log records for each transaction to have a plurality of log record chains held in a log management table,
   deleting, when a COMMIT log is found in log information of said log records, information of a transaction of a log record chain including said COMMIT log from said plurality of log record chains, and
   updating data in a Logical Unit (LU) in said database area at physical position information in accordance with contents of said log information.

2. A database processing method according to claim 1, wherein:
   when said received access request is a read request, it is judged whether log information for updating data to be read is included in past log information having been received in write requests till then or not; and
   when said log information for updating said data to be read is included in said past log information, said data to be read is updated in accordance with contents of said included log information.

3. A database processing method according to claim 1, wherein update is performed using, of said log information, log information of a committed transaction.

4. A database processing method according to claim 1, wherein updating said data of said database area is performed in parallel for each physical disk corresponding to said data of said database area.

5. A database processing method according to claim 1, wherein when said data of said database area to be updated in accordance with contents of said log information is present in another storage unit, said contents of said log information are transmitted to said storage unit, and said data of said database area is updated in said another storage unit.

6. A storage unit for performing processing by which contents of database processing carried out on a computer are forced to a database in said storage unit, comprising:
   a control processing portion for receiving an access request transmitted from said computer, and judging whether said received access request is a write request or a read request; and
   an update processing portion for judging whether contents to be written are log information of a plurality of log records indicating contents of database processing carried out on said computer when said received access request is a write request and converting position information indicated in said log information, with reference to a conversion table indicating correspondence of logical position information recognized in said database processing on said computer, to physical position information in said storage unit when said contents to be written are said log information,
   wherein, when said received access request is a write request and said contents to be written are log information, said update processing portion chains said plurality of log records for each transaction to have a plurality of log record chains held in a log management table, deletes, when a COMMIT log is found in log information of said log records, information of a transaction of a log record chain including said COMMIT log from said plurality of log record chains, and updates data in a Logical Unit (LU) in said database area at physical position information in accordance with contents of said log information.

7. A storage unit according to claim 6, wherein said update processing portion judges whether log information for updating data to be read is included in past log information having been received in write requests till then when said received access request is a read request; and when said log information for updating said data to be read is included in said past log information, said update processing portion updates said data to be read in accordance with contents of said included log information.

8. A database processing system for performing processing by which contents of database processing carried out on a computer are forced to a database in a storage unit, comprising:
   a computer, including a database management processing portion, for transmitting a write request of log information from said computer to a storage unit when there occurs necessity to reflect contents of a database buffer of said computer onto a storage in said storage unit, said log information of a plurality of log records indicating contents of database processing carried out on said database buffer and transmitting a read request of data to be accessed in said database processing from said computer to said storage unit when said data is absent from said database buffer;
   a control processing portion of said storage unit for receiving an access request transmitted from said computer, and judging whether said received access request is a write request or a read request; and
   an update processing portion of said storage unit for judging whether contents to be written are said log information indicating contents of database processing carried out on said computer when said received access request is a write request, converting position information indicated in said log information, with reference to a conversion table indicating correspondence of logical position information recognized in said database processing on said computer, to physical position information in said storage unit when said contents to be written are said log information,
   wherein, when said received access request is a write request and said contents to be written are log information, said update processing portion chains said plurality of log records for each transaction to have a plurality of log record chains held in a log management table, deletes, when a COMMIT lop is found in lop information of said lop records, information of a transaction of a lop record chain including said COMMIT lop from said plurality of log record chains, and updates data in a Logical Unit (LU) in said database area at physical position information in accordance with contents of said log information.

9. A database processing system according to claim 8, wherein:

when said received access request is a read request, it is judged whether log information for updating data to be read is included in past log information having been received in write requests till then or not; and when said log information for updating said data to be read is included in said past log information, said data to be read is updated in accordance with contents of said included log information.

10. A database processing system according to claim 8, wherein update is performed using, of said log information, log information of a committed transaction.

11. A database processing system according to claim 8, wherein updating said data of said database area is performed in parallel for each physical device corresponding to said data of said database area.

12. A database processing system according to claim 8, wherein when said data of said database area to be updated in accordance with contents of said log information is present in another storage unit said contents of said log information are transmitted to said another storage unit, and said data of said database area is updated in said another storage unit.

13. A database processing program having computer readable codes stored on a storage medium, for making a computer function as a storage unit for performing processing when read into a computer by which contents of database processing carried out on said computer are forced to a database in a storage unit connected through a network to said computer, wherein said database processing program makes said computer function as:

a control processing portion for receiving an access request transmitted from said computer, and judging whether said received access request is a write request or a read request; and an update processing portion for judging whether contents to be written are log information of a plurality of log records indicating said contents of said database processing carried out on said computer when said received access request is a write request and converting position information indicated in said log information, with reference to a conversion table indicating correspondence of logical position information recognized in said database processing on said computer, to physical position information in said storage unit when said contents to be written are said log information, wherein, when said received access request is a write request and said contents to be written are log information, said update processing portion further chains said plurality of log records for each transaction to have a plurality of log record chains held in a log management table, deletes, when a COMMIT log is found in log information of said log records, information of a transaction of a log record chain including said COMMIT log from said plurality of log record chains, and updates data in a Logical Unit (LU) in said database area at physical position information in accordance with contents of said log information.

14. A database processing program according to claim 13, wherein:

when said received access request is a read request, it is judged whether log information for updating data to be read is included in past log information having been received in write requests till then or not; and when said log information for updating said data to be read is included in said past log information, said data to be read is updated in accordance with contents of said included log information.

15. A database processing program according to claim 13, wherein update is performed using, of said log information, log information of a committed transaction.

16. A database processing program according to claim 13, wherein updating said data of said database area is performed in parallel for each physical device corresponding to said data of said database area.

17. A database processing program according to claim 13, wherein when said data of said database area to be updated in accordance with contents of said log information is present in another storage unit, said contents of said log information are transmitted to said storage unit, and said data of said database area is updated in said storage unit.

* * * * *